US012368751B2

(12) United States Patent
Matsumoto

(10) Patent No.: US 12,368,751 B2
(45) Date of Patent: Jul. 22, 2025

(54) ELECTRONIC DEVICE AND METHOD FOR CONTROLLING ELECTRONIC DEVICE

(71) Applicant: SEIKO EPSON CORPORATION, Tokyo (JP)

(72) Inventor: Akira Matsumoto, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 269 days.

(21) Appl. No.: 17/648,757

(22) Filed: Jan. 24, 2022

(65) Prior Publication Data
US 2022/0239691 A1   Jul. 28, 2022

(30) Foreign Application Priority Data

Jan. 27, 2021 (JP) .................................. 2021-011207

(51) Int. Cl.
G06F 7/04 (2006.01)
H04L 9/40 (2022.01)

(52) U.S. Cl.
CPC ...... H04L 63/1466 (2013.01); H04L 63/0884 (2013.01)

(58) Field of Classification Search
CPC ...... G06F 21/554; G06F 21/577; G06F 21/55; G06F 21/335; G06F 21/31; H04L 63/1416; H04L 63/1433; H04L 63/1466; H04L 63/0884
See application file for complete search history.

(56) References Cited

U.S. PATENT DOCUMENTS

| 9,185,536 | B1* | 11/2015 | Johnson | .................. H04W 4/16 |
| 9,275,226 | B1* | 3/2016 | Roundy | .................. G06F 21/56 |
| 2007/0097976 | A1* | 5/2007 | Wood | .................. H04L 63/1416 370/392 |
| 2007/0220256 | A1 | 9/2007 | Yasui et al. | |

(Continued)

FOREIGN PATENT DOCUMENTS

| CN | 1708002 | 12/2005 |
| CN | 101043322 | 9/2007 |

(Continued)

OTHER PUBLICATIONS

Jalalitabar et al, Demonstrating the Threat of Hardware Trojans in Wireless Sensor Networks, Aug. 6, 2015, IEEE, pp. 1-8. (Year: 2015).*

(Continued)

Primary Examiner — Philip J Chea
Assistant Examiner — Jenise E Jackson
(74) Attorney, Agent, or Firm — WORKMAN NYDEGGER

(57) ABSTRACT

An electronic device that is communicatively connected to a network includes a communication unit that is communicatively connected to the network, a processor, and a display. The processor performs a detection process of detecting an attack made against the electronic device via the network. When the attack is detected by the detection process, the processor performs a stop process of stopping a function included and used in the communication unit and causes the display to display an authentication information entry prompting indicator that prompts to enter authentication information. When the authentication information is entered, the processor cancels the stop process.

11 Claims, 15 Drawing Sheets

(56) References Cited

U.S. PATENT DOCUMENTS

| | | |
|---|---|---|
| 2007/0245404 A1 | 10/2007 | Okano |
| 2010/0064369 A1* | 3/2010 | Stolfo .................. G06F 21/566 726/24 |
| 2012/0110673 A1* | 5/2012 | Hoglund ................ G06F 21/57 726/25 |
| 2015/0026806 A1* | 1/2015 | Lingafelt ............ H04L 63/1441 726/23 |
| 2015/0381442 A1* | 12/2015 | Delgado ............. G06F 9/45558 713/168 |
| 2016/0057169 A1* | 2/2016 | Honda ................ H04L 63/1416 726/1 |
| 2016/0203325 A1* | 7/2016 | Eppensteiner ........ G06F 21/629 726/20 |
| 2016/0218071 A1* | 7/2016 | Nam ....................... G06F 21/86 |
| 2016/0371099 A1* | 12/2016 | Woog ....................... H04L 69/28 |
| 2017/0091461 A1* | 3/2017 | Tin ........................ G06F 21/53 |
| 2017/0104771 A1* | 4/2017 | Saito .................. H04L 63/1425 |
| 2017/0171235 A1* | 6/2017 | Mulchandani ........ G06F 21/554 |
| 2018/0232521 A1* | 8/2018 | Jeansonne ............. G06F 21/572 |
| 2020/0380117 A1* | 12/2020 | Marwah .............. H04L 63/1425 |
| 2021/0195063 A1* | 6/2021 | Ernst ..................... G06V 20/52 |

FOREIGN PATENT DOCUMENTS

| | | |
|---|---|---|
| CN | 107958165 A | 4/2018 |
| JP | 2006-041740 A | 2/2006 |
| JP | 2007-265023 A | 10/2007 |

OTHER PUBLICATIONS

Skowyra et al., Effective Topology Tampering Attacks and Defenses in Software-Defined Networks, Jun. 28, 2018, IEEE, pp. 374-385. (Year: 2018).*

* cited by examiner

ELECTRONIC DEVICE AND METHOD FOR CONTROLLING ELECTRONIC DEVICE

The present application is based on, and claims priority from JP Application Serial Number 2021-011207, filed Jan. 27, 2021, the disclosure of which is hereby incorporated by reference herein in its entirety.

BACKGROUND

1. Technical Field

The present disclosure relates to an electronic device, a method for controlling an electronic device, and the like.

2. Related Art

An electronic device communicatively connected to a network may receive an attack via the network. JP-A-2006-041740 discloses a method for detecting a virus that intruded in an image processing device via a network, and stopping the use of the network after notifying that the virus has been detected.

However, when the network is uniformly stopped, the convenience of the electronic device is reduced. Although the electronic device can be used again after being reactivated, the electronic device may receive an attack again. Furthermore, an administrator of the electronic device is not limited to a user of the electronic device, and thus a method that allows the administrator to immediately recognize that an attack has been made is not established. Since such circumstances are not considered in the method described in JP-A-2006-041740, it cannot be said that an appropriate measure is taken for the electronic device against which an attack has been made.

SUMMARY

According to an aspect of the present disclosure, an electronic device that is communicatively connected to a network includes a communication unit that is communicatively connected to the network, a processing unit, and a display unit. The processing unit performs a detection process of detecting an attack made against the electronic device via the network. When the attack is detected by the detection process, the processing unit performs a stop process of stopping a function included and used in the communication unit and causes the display unit to display an authentication information entry prompting indicator that prompts to enter authentication information. When the authentication information is entered, the processing unit cancels the stop process.

According to another aspect of the present disclosure, a method for controlling an electronic device includes communicatively connecting the electronic device to a network, performing a detection process of detecting an attack made against the electronic device via the network, performing a stop process of stopping a function used for communication and displaying an authentication information entry prompting indicator that prompts to enter authentication information when the attack is detected by the detection process, and canceling the stop process when the authentication information is entered.

DESCRIPTION OF EXEMPLARY EMBODIMENTS

Hereinafter, an embodiment is described. The embodiment described below does not unduly limit features of the present disclosure that are described in the claims. In addition, not all of configurations described below are necessarily essential configuration requirements of the present disclosure.

Figure 1:
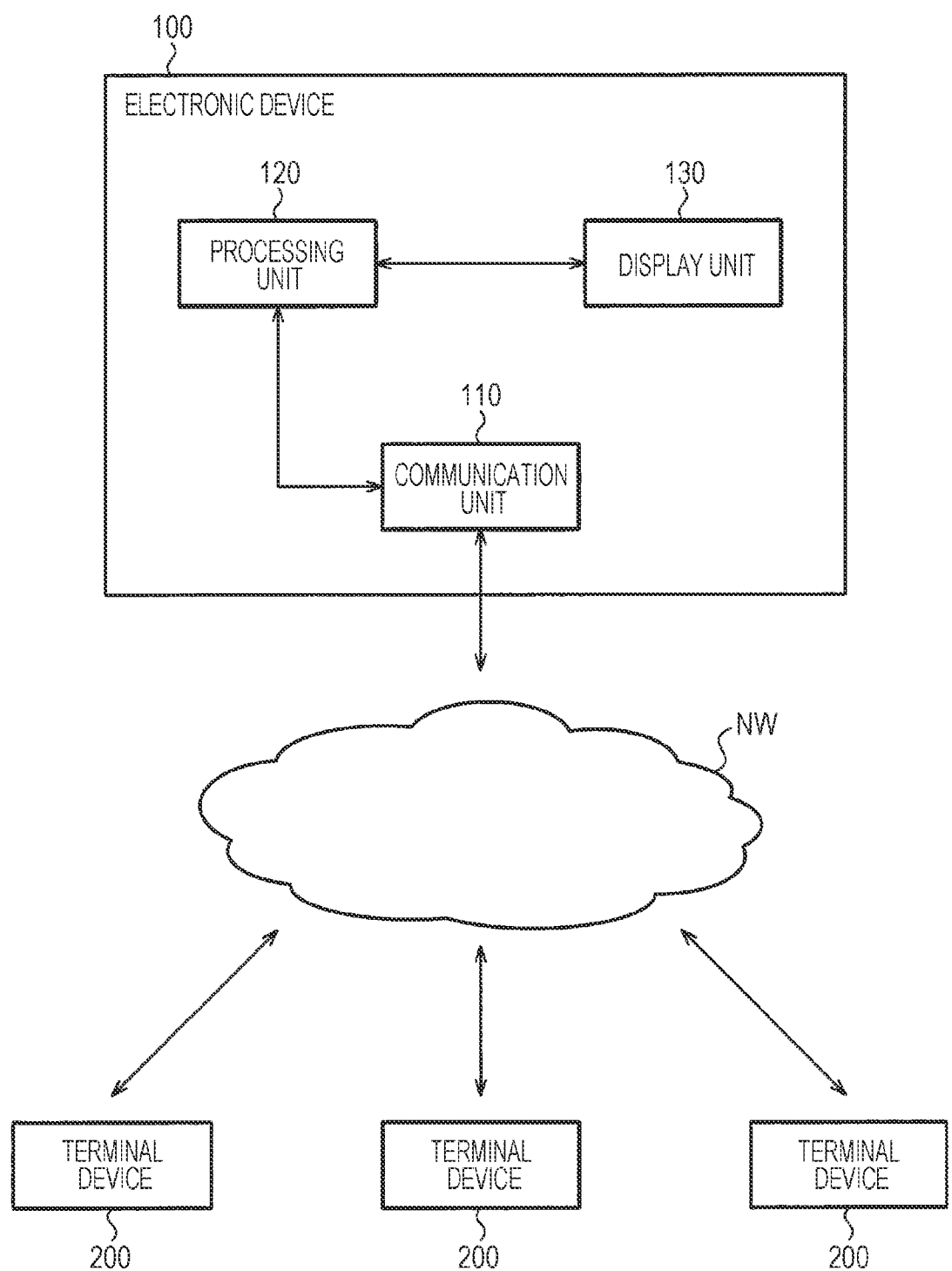
FIG. 1 is a block diagram illustrating an example of a configuration of an electronic device.

A basic configuration according to the embodiment is described with reference to FIGS. 1, 2, and 3. FIG. 1 is a block diagram illustrating an example of a configuration of a system including an electronic device 100 according to the embodiment. As illustrated in FIG. 1, the electronic device 100 according to the embodiment includes a communication unit 110, a processing unit 120, and a display unit 130. The electronic device 100 is, for example, a printer, but may be a personal computer, a wearable device, a biological information measuring device, a robot, a video device, a physical quantity measuring device, or the like. The wearable device is a smart watch, an activity tracker, or the like. The biological information measuring device is a pulsimeter, a pedometer, or the like. The video device is a camera, a projector, or the like. The physical quantity measuring device is a thermometer, a weight scale, or the like. The printer may be a multifunction machine. The multifunction machine is a printer including functions other than a printer function. The functions other than the printer function are a copy function, a facsimile function, a scanner function, and the like, but may be other functions. The electronic device 100 according to the embodiment has predetermined firmware embedded therein. The predetermined firmware is, for example, configured with open-source software, but may be software originally developed by a manufacturer of the electronic device 100. In the following description, the open-source software may be referred to as OSS.

The communication unit 110 is a communication interface that is communicatively connected to a terminal device 200 via a network NW. The communication unit 110 can be implemented as a single semiconductor device having a communication function conforming to a predetermined communication standard, but may be implemented as a function of a semiconductor device having a communication function and other functions. The predetermined communication standard is, for example, a standard for wired communication, such as Ethernet (registered trademark) or Universal Serial Bus (USB), or a standard for wireless communication, such as Wi-Fi (registered trademark), but may be another communication standard. When the predetermined communication standard is the foregoing wireless communication standard for Wi-Fi (registered trademark), wireless communication is enabled via an access point not illustrated. Specifically, the access point not illustrated periodically transmits a radio wave for wireless communication. The radio wave is, for example, a beacon from which identification information of the access point can be deciphered. The identification information of the access point is, for example, a service set identifier (SSID). When the electronic device 100 or the terminal device 200 receives the radio wave from the access point, and a user of the device 100 or 200 that has received the radio wave enters a predetermined password in the device 100 or 200, the device 100 or 200 that has received the radio wave can connect to the access point. In the case where the device 100 or 200 connects to the same access point again, the device 100 or 200 can automatically connect to the access point without an entry of the password by the user. The access point may be referred to as router. In the embodiment, "communicatively connected the communication standard" may be merely referred to as "connected".

The processing unit 120 controls the communication unit 110 and other units of the electronic device 100 and executes a job. The job includes a command, an instruction, or the like given by an external device such as the terminal device 200 to the electronic device 100. The processing unit 120 can execute a job not given via the communication unit 110. The job not given via the communication unit 110 is given via an operation of an operational unit not illustrated, or the like.

The processing unit 120 is specifically a processor or a controller. The processing unit 120 may include, for example, a plurality of CPUs such as a main CPU and a sub-CPU. The main CPU controls the units of the electronic device 100 and controls the entire electronic device 100. The sub-CPU controls communication of the communication unit 110, for example. When the electronic device 100 is a printer, the electronic device 100 may further include a CPU that performs various types of processing for printing. The processing unit 120 according to the embodiment may be constituted by the following hardware. The hardware may include either one or both of a circuit that processes a digital signal and a circuit that processes an analog signal. The hardware may be constituted by one or multiple circuit devices mounted on a circuit board or may be constituted by one or multiple circuit elements mounted on a circuit board. The circuit devices are, for example, integrated circuit devices. The circuit elements are, for example, active elements such as transistors or passive elements such as resistors or capacitors.

The processing unit 120 can be implemented as the following processor. The electronic device 100 according to the embodiment includes a memory that stores information and the processor that operates based on the information stored in the memory. The memory is not illustrated. The information is, for example, a program and various data, or the like. The processor includes hardware. As the processor, various processors such as a central processing unit (CPU), a graphics processing unit (GPU), and a digital signal processor (DSP) can be used. The memory may be a semiconductor memory such as a static random-access memory (SRAM) or a dynamic random-access memory (DRAM), a register, a magnetic storage device such as a hard disk drive, or an optical storage device such as an optical disc device. The memory stores, for example, a computer-readable command. The processor executes the command, thereby enabling a function of the processing unit 120 as a process. The command may be a command set constituting a program or may be a command that instructs a hardware circuit of the processor to operate. In addition, a part of or the entire processing unit 120 may be enabled by cloud computing.

The display unit 130 is constituted by a display that displays various information to a user, or the like. Specifically, the display unit 130 can be implemented as a liquid crystal display, but may be implemented as an organic EL display, a dot matrix LED, or the like. The display unit 130 may be a touch panel that has an operational function and serves as unified hardware. The display unit 130 may notify the user of information on the electronic device 100. In the embodiment, it is assumed that the display unit 130 is a touch panel.

The terminal device 200 illustrated in FIG. 1 has a communication function and transmits a predetermined job to the electronic device 100 via the network NW. The terminal device 200 is, for example, a personal computer, but may be a mobile information terminal or the like. The communication function of the terminal device 200 may be a wired communication function or a wireless communication function and conforms to the same communication standard as the electronic device 100. A user uses the terminal device 200 to transmit, to the electronic device 100, data including identification information specific to the terminal device 200. The identification information specific to the terminal device 200 is, for example, an IP address or a MAC address. Therefore, even when a plurality of terminal devices 200 belong to the access point not illustrated, the electronic device 100 can identify the plurality of terminal devices 200.

Figure 2:
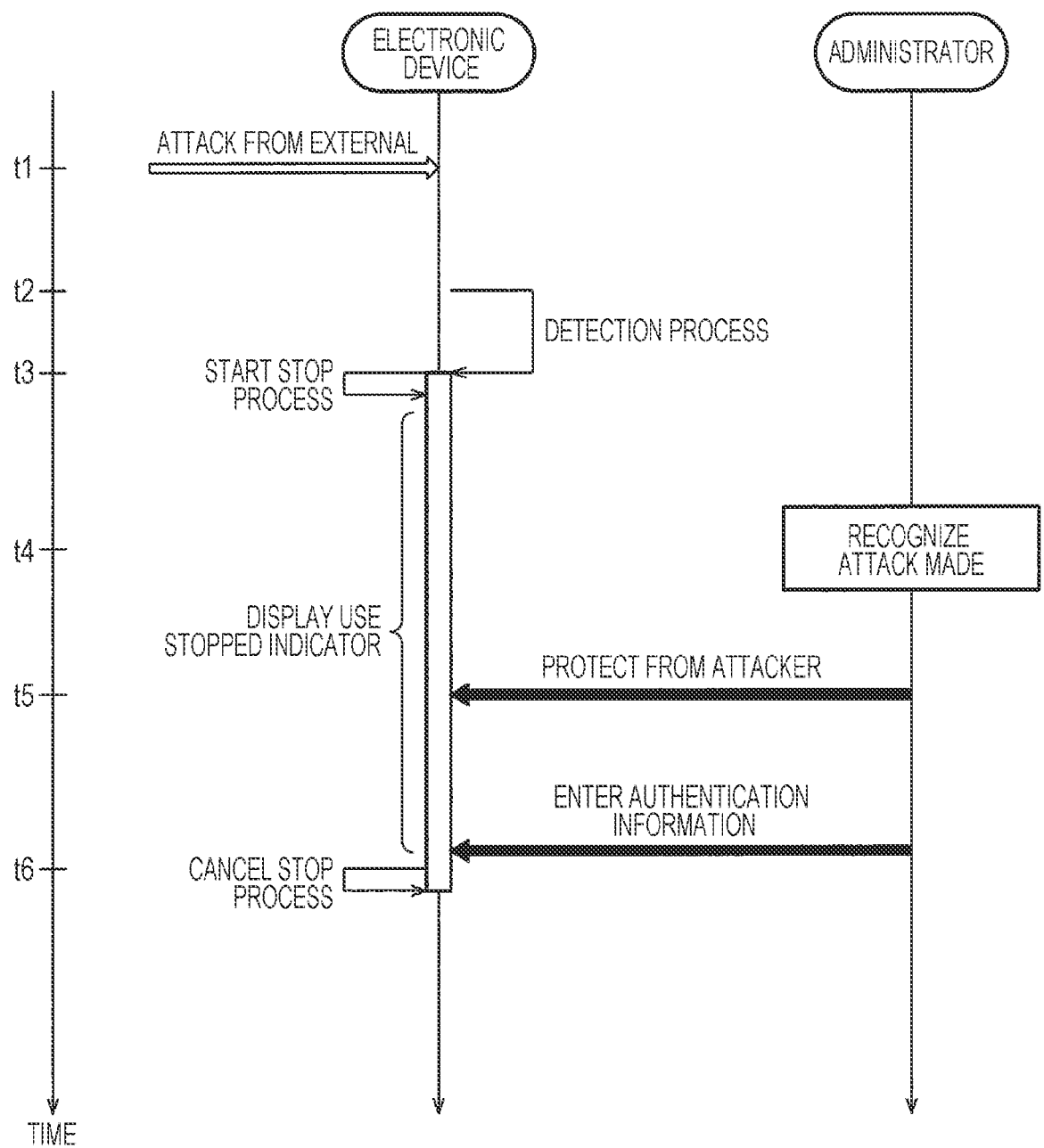
FIG. 2 is a diagram illustrating an example of a process procedure according to an embodiment.

FIG. 2 is a diagram illustrating an example of a process procedure according to the embodiment. Specifically, FIG. 2 illustrates relationships between processes to be performed by the processing unit 120 of the electronic device 100 and operations to be performed on the electronic device 100 by an administrator. The administrator may be a person who mechanically installs the electronic device 100, maintains the electronic device 100, and manages settings of the network. In FIG. 2, a vertical axis is a time axis, and time advances downward. A specific length on the vertical axis does not indicate a length of time.

It is assumed that the electronic device 100 receives an attack from an external at time t1. Specifically, the attack is made via the network NW and is, for example, an action of transmitting program data that is not required by the electronic device 100, or the like. The attack may be another action. Specifically, the communication unit 110 is controlled by an operating system (OS) based on OSS such as Linux (registered trademark). When the OSS has a defect relating to information security, a predetermined problem may occur due to an effect of the defect. The predetermined problem is that information registered in the electronic device 100 is stolen via the communication unit 110 and used, or that an attack is made against another external device via the electronic device 100, or the like. Similarly, when the terminal device 200 has a defect relating to information security, the terminal device 200 may serve as an attacker and attack the electronic device 100. That is, an attack may be made against the electronic device 100 via the terminal device 200 or the like. Such a defect relating to information security may be referred to as vulnerability. In the following description, an attack received by the electronic device 100 from an external via the network NW is merely referred to as attack.

At time t2 after the time t1, the processing unit 120 performs a detection process. The detection process is a process to be performed to detect that the electronic device 100 has received an attack. Specifically, the detection process can be performed by the processing unit 120 periodically performing a process of scanning a program and data in the electronic device 100 at predetermined time intervals. As the predetermined intervals are reduced, an interval between the time t1 and the time t2 is reduced to the shortest interval. Therefore, the processing unit 120 can quickly detect that an attack has been made.

The processing unit 120 performs the detection process at the time t2 to detect that the electronic device 100 has received an attack from an external. In this case, at time t3 after the time t2, the processing unit 120 starts a stop process. The stop process is a process of stopping a function of the communication unit 110 to stop the use of the electronic device 100. Specifically, the processing unit 120 performs the stop process to stop a communication function of a communication IC that enables the communication unit 110. At the time t3, the use of a predetermined part of the electronic device 100 may not be stopped. The predetermined part is only a function that does not require the communication unit 110. For example, when the electronic device 100 is a printer, the predetermined part is a copy function or the like. It is assumed that, at the time t3, the administrator does not yet recognize that the attack has been made against the electronic device 100.

Figure 3:
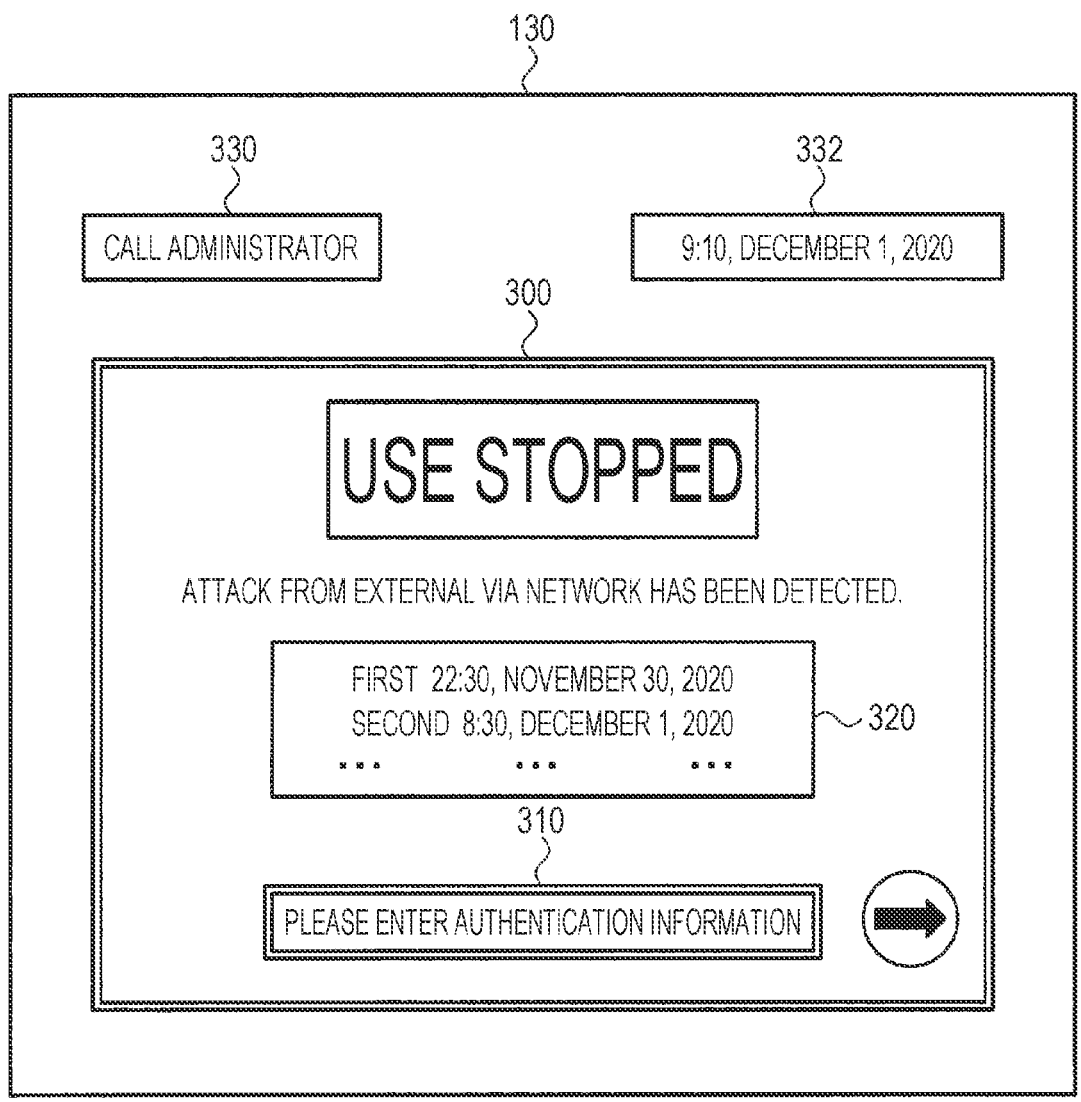
FIG. 3 is a diagram illustrating an example of a use stopped indicator.

When the stop process is started at the time t3, a use stopped indicator 300 indicating that the function included and used in the communication unit 110 has been stopped is displayed by the display unit 130, as illustrated in FIG. 3. The use stopped indicator 300 includes an authentication information entry prompting indicator 310 that prompts to enter authentication information. The authentication information entry prompting indicator 310 is an icon. When the authentication information entry prompting indicator 310 is selected, the authentication information can be entered. The authentication information is entered to cancel the stop process and delete the use stopped indicator 300. The authentication information is, for example, a password that is a random character string, or the like. Although described in detail, the stop process is controlled such that the stop process is not canceled unless the authentication information is entered.

The use stopped indicator 300 may include another indicator. For example, as illustrated in FIG. 3, the use stopped indicator 300 may include an attack history indicator 320. In this case, when the administrator recognizes that an attack has been made, the administrator can grasp the number of times that the attack has been made and the frequency of the attack, and thus can appropriately determine a measure to be taken for the electronic device 100. For example, when an attack is periodically made against the electronic device 100 for a long time period, the administrator can determine to take a measure to protect the electronic device 100 from the attack. In addition, for example, when an attack is concentrated on the electronic device 100 multiple times but is not made after that, the administrator can determine not to take any measure. This is due to the fact that the terminal device 200 via which the attack has been made may be already removed.

During the stop process, only the use stopped indicator 300 may be displayed by the display unit 130 or another indicator other than the use stopped indicator 300 may be further displayed by the display unit 130. For example, as illustrated in FIG. 3, the display unit 130 may display a call administrator indicator 330. The call administrator indicator 330 is a user-selectable icon. For example, when the user selects the call administrator indicator 330, a predetermined notification arrives at a mobile terminal owned by the administrator or the like. In this case, when the user recognizes the use stopped indicator 300, the user can quickly contact the administrator. In addition, for example, as illustrated in FIG. 3, the display unit 130 may display a time indicator 332 or may display another indicator, which is not illustrated and is, for example, an indicator relating to a function that does not use the communication unit 110 and is a copy function or the like. When such an indicator is displayed, it is possible to prevent an attack from being made against the electronic device 100 again and prevent a reduction in the convenience of the electronic device 100.

At time t4 after the time t3, the administrator recognizes that the attack has been made against the electronic device 100. Then, the administrator considers what measure is to be taken for the electronic device 100.

At time t5 after the time t4, the administrator takes a measure to protect the electronic device 100 from an attacker. Taking the measure to protect the electronic device 100 from the attacker is, for example, to identify a terminal device 200 of the attacker and remove the terminal device 200 from the network NW, but may include taking other measures. Removing the terminal device 200 from the network NW is, for example, to remove a network cable from the terminal device 200 when the network NW is a wired network, or to disable a wireless communication connection function of the terminal device 200, delete access point information stored in the terminal device 200, or the like when the network NW is a wireless network. The other measures are, for example, to remove the electronic device 100 from the network NW, change the IP address of the electronic device 100, and the like. In this case, it is assumed that the administrator can change the IP address of the electronic device 100 without reactivating the electronic device 100 while the use stopped indicator 300 is displayed by the display unit 130.

At time t6 after the time t5, the administrator enters the authentication information. Specifically, the administrator selects the authentication information entry prompting indicator 310 displayed by the display unit 130 and enters the authentication information using an operational unit or the like of the electronic device 100. The operational unit is not illustrated. When the administrator is authenticated, the stop process is canceled. Specifically, the function of the communication unit 110 becomes available and the use stopped indicator 300 is deleted from the display unit 130.

As described above, the electronic device 100 according to the embodiment is communicatively connected to the network NW and includes the communication unit 110 that is communicatively connected to the network NW, the processing unit 120, and the display unit 130. The processing unit 120 performs the detection process of detecting an attack made against the electronic device 100 via the network NW. When the attack is detected by the detection process, the processing unit 120 performs the stop process of stopping the function included and used in the communication unit 110 and causes the display unit 130 to display the authentication information entry prompting indicator 310 that prompts to enter the authentication information. When the authentication information is entered, the processing unit 120 cancels the stop process.

Since the electronic device 100 includes the communication unit 110, the electronic device 100 can be communicatively connected to an external via the network NW. In addition, since the electronic device 100 includes the processing unit 120, the processing unit 120 can control the units of the electronic device 100. Furthermore, since the electronic device 100 includes the display unit 130, the electronic device 100 can display the authentication information entry prompting indicator 310 that prompts the administrator to enter the authentication information. Furthermore, since the processing unit 120 can perform the stop process and cancel the stop process on the condition that the authentication information is entered, the processing unit 120 can protect the electronic device 100 from an attacker and prevent an attack from being frequently made until the authentication information is entered, and thus can appropriately handle the attack made against the electronic device 100.

The embodiment may be implemented as a method for controlling the electronic device 100. Specifically, the method for controlling the electronic device 100 according to the embodiment may include communicatively connecting the electronic device 100 to the network NW, performing the detection process of detecting an attack made against the electronic device 100 via the network NW, performing the stop process of stopping the function used for communication and displaying the authentication information entry prompting indicator 310 that prompts to enter the authentication information when the attack is detected by the detection process, and canceling the stop process when the authentication information is entered. This can obtain the same effects as described above.

Figure 4:
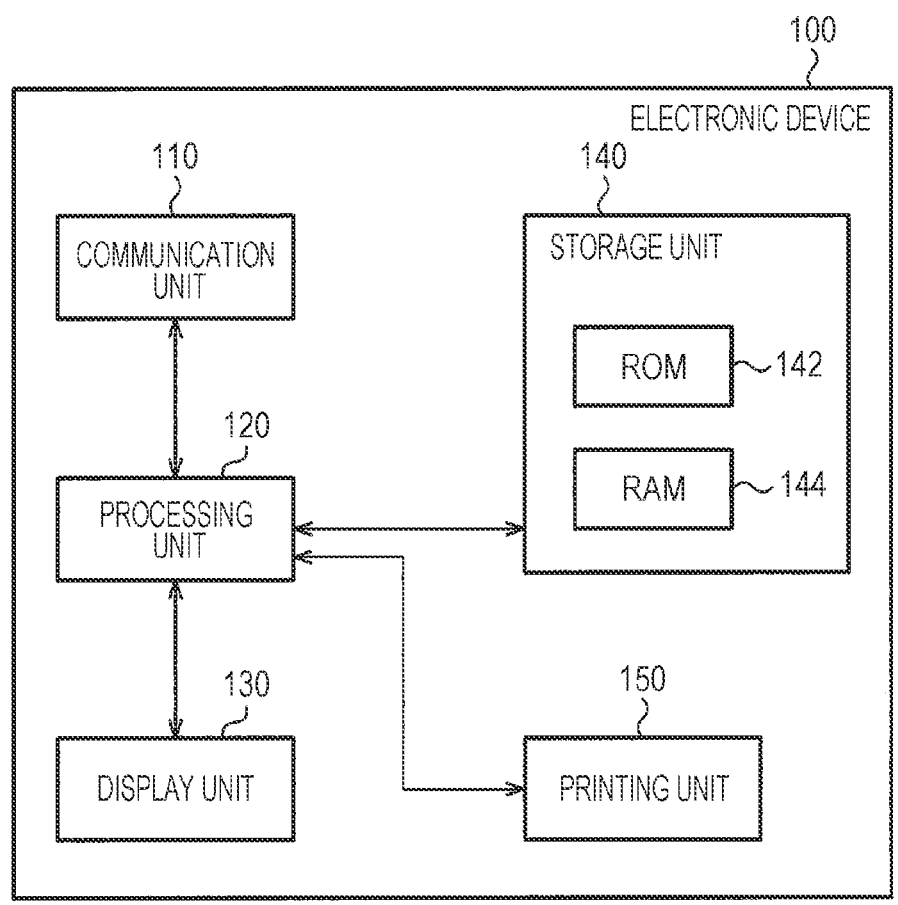
FIG. 4 is a block diagram illustrating an example of a detailed configuration of the electronic device.

The electronic device 100 according to the embodiment is not limited to the foregoing configuration and can be variously modified by, for example, adding another component to the electronic device 100. For example, as illustrated in FIG. 4, the electronic device 100 may further include a storage unit 140 and a printing unit 150 and may further include an operational unit and a notifying unit that are not illustrated. The operational unit can be implemented as a unit that receives an input operation from the user and is a button, a keyboard, a touch sensor, a voice input microphone, or the like. The notifying unit can be implanted as a speaker that outputs audio, but may be implemented as a vibration motor that generates vibration, or a piezoelectric element, or may be implemented as an LED, a fluorescent light, or the like that emits light, or may be implemented as a combination thereof.

The storage unit 140 includes a read-only memory (ROM) 142 and a random-access memory (RAM) 144. The ROM 142 stores a program and data within the electronic device 100 in advance. The RAM 144 stores details of a temporary process and calculation that are to be executed in the electronic device 100. The program is executed to perform, for example, processes relating to a main process (step S10) described later and a timer interruption process (step S20). The data is, for example, information on the attack history indicator 320 described above. When the electronic device 100 is a printer described later, information on the printer may be stored in the ROM 142. The information on the printer is, for example, a record of a job from the terminal device 200 or the like, but may be other information. The record of the job is, for example, the identification information of the access point, the type of the job, an operation amount, an execution time of the job, and the like, but may be another record. The type of the job is, for example, printing, faxing, or the like. When the electronic device 100 is a printer, the operation amount is, for example, the number of printed sheets, the amount of consumed ink, or the like.

The ROM 142 can be implemented as, for example, a nonvolatile memory, but may be implemented as a magnetic storage device, an optical storage device, or the like. The nonvolatile memory is, for example, an electrically erasable programmable read-only memory (EEPROM), a flash memory, or the like. The EEPROM can be implemented as, for example, a floating gate memory cell or the like. The flash memory can be implemented as, for example, a metal oxide nitride oxide silicon (MONOS) memory cell or the like. The magnetic storage device is, for example, an HDD. The optical storage device is, for example, a CD-ROM, a DVD-ROM, or the like. The RAM 144 can be implemented as, for example, a dynamic random-access memory (DRAM) or a static random-access memory (SRAM) that is a semiconductor memory.

The printing unit 150 prints an image on a print medium such as paper and is implemented as, for example, a printing engine. The printing engine includes, for example, an ink jet ejecting head and may include a driving mechanism for driving a carriage that drives the ejecting head, or the like. The printing engine ejects ink from the ejecting head onto the print medium transported by a transport mechanism so as to print an image on the print medium. The printing engine may use a laser method to perform printing with toner.

As described above, the electronic device 100 according to the embodiment may include the printing unit 150 that performs printing based on print data received via the communication unit 110. In this case, the electronic device 100 can be used as a printer that supports the network connection. Although printers have not been recognized as devices against which such an attack is made, the method according to the embodiment can be applied to appropriately handle an attack made against the printer that supports the network connection.

The method according to the embodiment is not limited to the examples illustrated in FIGS. 2 and 3 and can be variously modified. For example, the authentication information entered on the authentication information entry prompting indicator 310 illustrated in FIG. 3 may be information known by only the administrator. When the authentication information is known by a person other than the administrator, the person other than the administrator may be able to cancel the stop process at a point of time when an appropriate measure is not taken for the electronic device 100, and the information known by the person is not desirable. That is, when an attack is detected by the detection process, the processing unit 120 performs the stop process and causes the display unit 130 to display the authentication information entry prompting indicator 310 that prompts to enter the authentication information to be used for authentication of the administrator who manages the network connection of the electronic device 100. Therefore, after the administrator recognizes that the stop process has been performed, the stop process is reliably canceled. Therefore, it is possible to appropriately handle an attack made against the electronic device 100.

The entry of the password is described above as a method for entering the authentication information. However, the method for entering the authentication information is not limited thereto. For example, the electronic device 100 may perform authentication using a method in which an electronic card owned by the administrator is placed at a predetermined position on the electronic device 100. Alternatively, the electronic device 100 may perform biometric authentication using a predetermined method. The predetermined method is, for example, a face authentication method, a fingerprint authentication method, a voice authentication method, or the like, but may be another method. The electronic device 100 may perform authentication using a combination of two or more of the methods for entering the authentication information. That is, when the authentication information is entered by using one or more of the password, the electronic card, and the biometric authentication, the processing unit 120 cancels the stop process. In this case, since the stop process can be smoothly canceled, it is possible to appropriately handle an attack made against the electronic device 100. Specifically, when the authentication information is the password, the administrator may forget the password. Therefore, the authentication method using the electronic card or the authentication method using the biometric authentication may be convenient.

For example, in a predetermined case, it may be convenient for the user when the stop process is not performed at the time of the occurrence of an attack. The predetermined case is a case in which a certain attack occurs once but any attack does not occur after the occurrence of the certain attack, or the like. In this case, when the stop process is performed, a time period for which the electronic device 100 cannot be used due to the stop process may be long, and thus it is considered that a disadvantage of reducing the convenience for the user is larger.

Therefore, the electronic device 100 may not perform the stop process before an attack is detected a number N of times. In other words, when an attack is detected by the detection process a number N (N is an integer of 2 or more) of times, the processing unit 120 may perform the stop process. For example, although not illustrated, the processing unit 120 may include hardware including a counter function of counting the number of times that an attack is made against the electronic device 100. The counter function can be implemented by adding a process of counting the number of times that an attack is made against the electronic device 100. In this case, while a reduction in the convenience of the electronic device 100 is prevented, the administrator can appropriately handle an attack made against the electronic device 100.

As described above, the electronic device 100 according to the embodiment has the predetermined firmware embedded therein. In other words, the electronic device 100 recognizes that only the specific program is installed. Therefore, specifically, the detection process according to the embodiment is a process of determining whether scanned program data is program data installed in the electronic device 100. That is, the processing unit 120 performs the detection process of detecting, as an attack, a program that intruded in the electronic device 100 via the network and is not recognized as a program installed in the electronic device 100. Therefore, the electronic device 100 can appropriately determine whether the electronic device 100 has received an attack, and can appropriately handle an attack made against the electronic device 100.

In a predetermined state, an external device connected to the electronic device 100 may be limited. The predetermined state is, for example, a state in which the electronic device 100 is connected to only an in-house terminal device 200 via an in-house LAN in a workplace, or the like. In this state, since an attack source is assumed to be the in-house terminal device 200, it is considered that an attack detected by the detection process is a program that intruded in the electronic device 100 from the in-house terminal device 200 via the network NW and is not installed in the electronic device 100. That is, the processing unit 120 performs the detection process of detecting, as an attack, the program that intruded in the electronic device 100 via the network NW from the terminal device 200 connected to the network NW and is not recognized as a program installed in the electronic device 100. Therefore, it is possible to quickly identify the cause of the attack and thus appropriately handle the attack made against the electronic device 100.

It is considered that, when an attack occurs, a program not originally installed is present in a region of the RAM 144. Therefore, when an attack occurs, it is desirable that a predetermined process be performed in order to delete information stored in the RAM 144. The predetermined process is, for example, a process of shutting down the electronic device 100, a process of reactivating the electronic device 100, or the like. This is due to the fact that the information stored in the RAM 144 is deleted by turning off the electronic device 100 once. In the embodiment, it is assumed that a program not originally installed in the electronic device 100 is not present in a region of the ROM 142 even when an attack is made against the electronic device 100.

The electronic device 100 according to the embodiment may not perform the stop process and may perform the reactivation process before an attack is detected the number N of times. This is due to the fact that it is considered that an attack occurs when the user wants to use the electronic device 100 for a long time period, and thus the process of reactivating the electronic device 100 is more desirable than the process of shutting down the electronic device 100 so as not to activate the electronic device 100 or the like. As described above, when an attack is detected by the detection process a number N-1 (N is an integer of 2 or more) of times, the processing unit 120 performs the reactivation process of reactivating the electronic device 100 and does not perform the stop process. Therefore, since the electronic device 100 can be used after an effect of the attack is removed, it is possible to appropriately handle the attack made against the electronic device 100.

Figure 5:
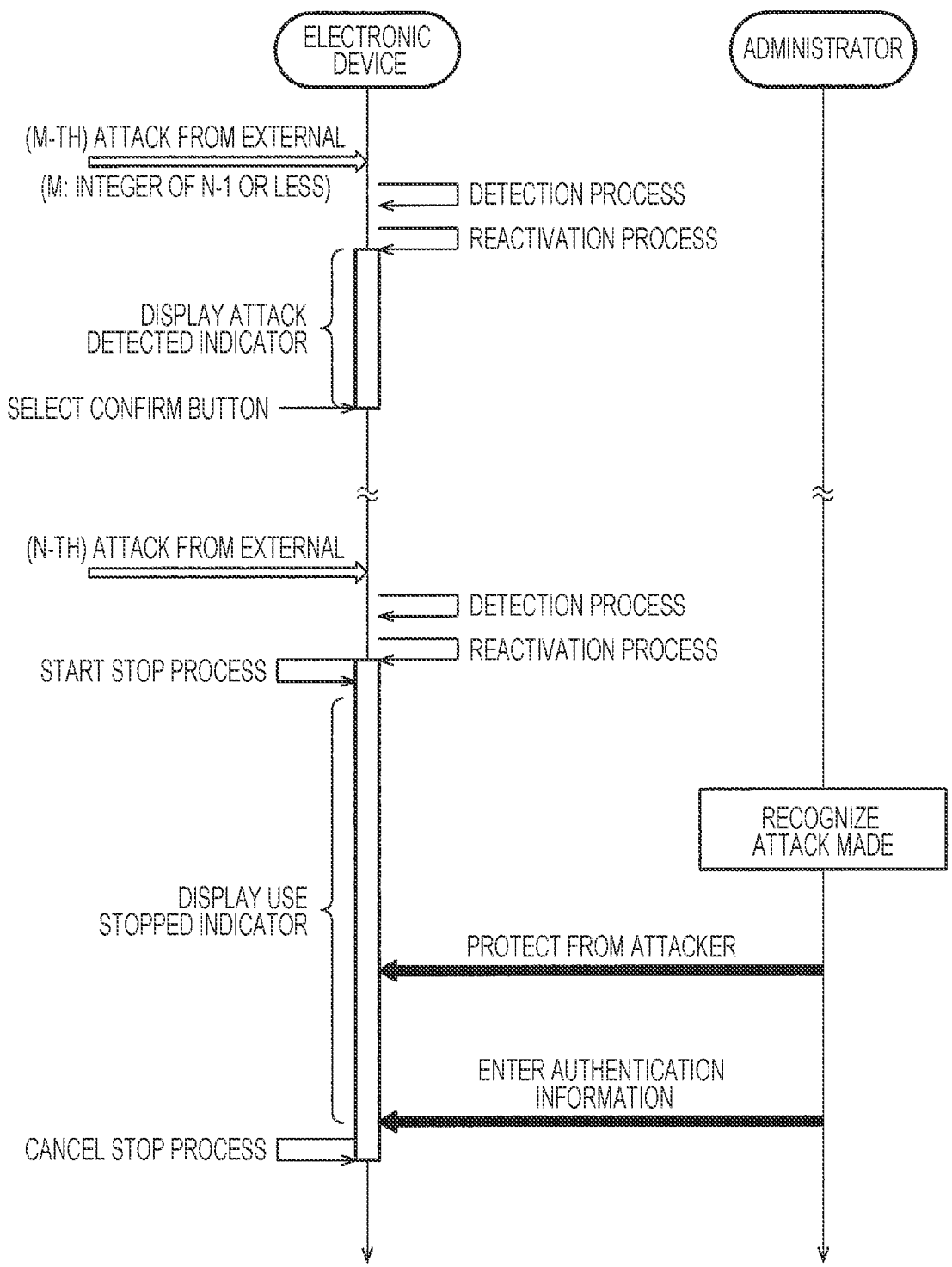
FIG. 5 is a diagram illustrating an example of another process procedure according to the embodiment.

FIG. 5 is a diagram illustrating an example of a specific process procedure in the case where the foregoing operations are considered. Although FIG. 5 does not illustrate a time axis, time advances downward in FIG. 5, like FIG. 2. As illustrated in FIG. 5, when the electronic device 100 detects an attack a number M of times in the detection process, the electronic device 100 performs the reactivation process of reactivating the electronic device 100. M is an integer in a range of 1 to N-1, and N is an integer of 2 or more as described above.

Figure 6:
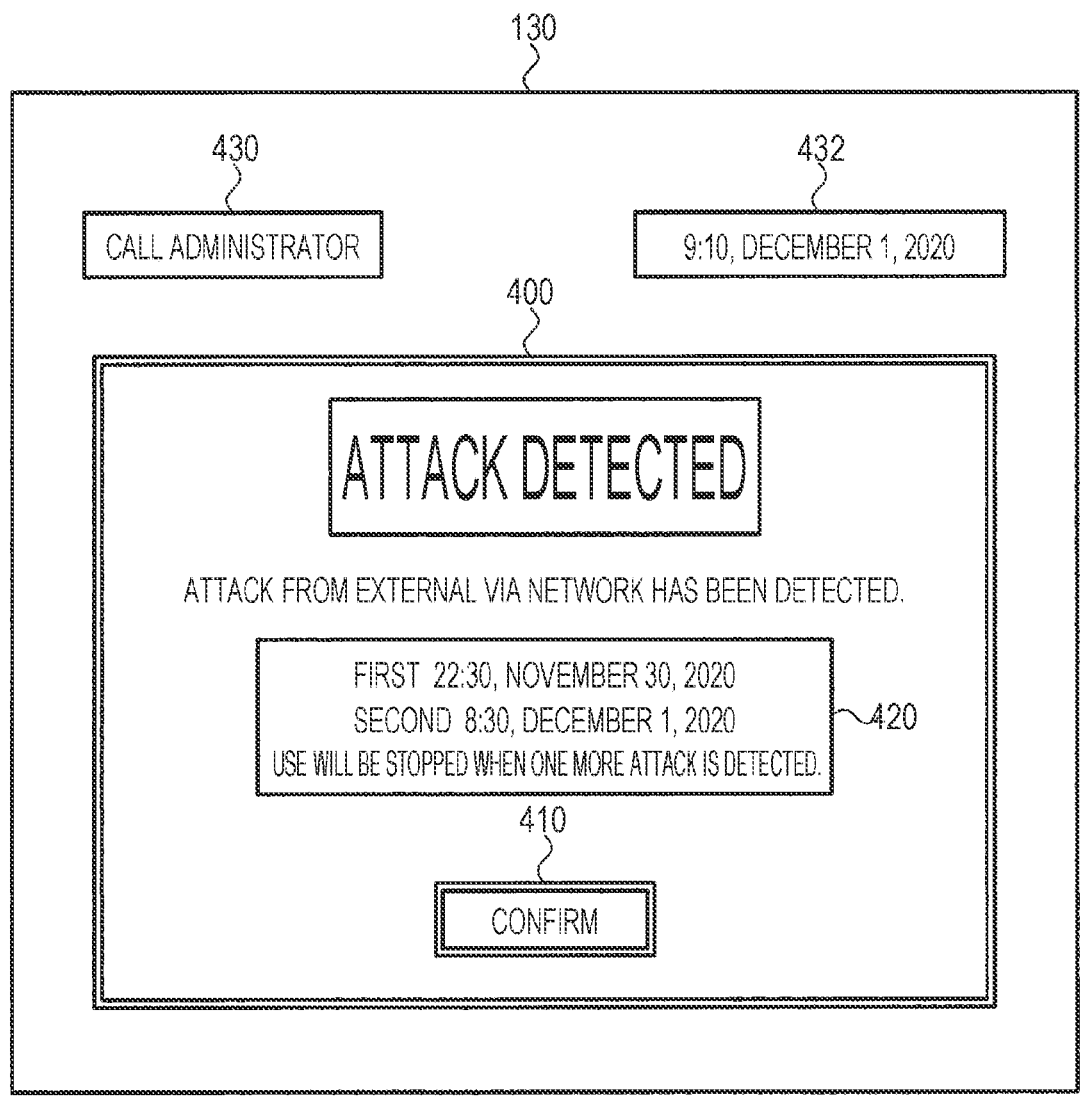
FIG. 6 is a diagram illustrating an example of an attack detected indicator.

After the electronic device 100 is reactivated, the electronic device 100 causes the display unit 130 to display an attack detected indicator 400. The attack detected indicator 400 indicates that an attack has been detected, as illustrated in FIG. 6, for example. The attack detected indicator 400 includes a confirm button indicator 410. When the confirm button indicator 410 is selected, the attack detected indicator 400 is deleted. As described above, even when an attack is made the number M of times, the administrator does not need to handle the attack. Therefore, the confirm button indicator 410 can be selected by any person. In other words, the attack detected indicator 400 is displayed only for the purpose of notifying that an attack has been detected.

The attack detected indicator 400 may include another indicator. For example, as illustrated in FIG. 6, the attack detected indicator 400 may include an attack history indicator 420. The attack history indicator 420 may indicate the number of times that an attack has been made before the start of the stop process. In this case, the user and the administrator can appropriately consider the state of the attack and determination for the attack. For example, in a predetermined situation, when the attack detected indicator 400 is displayed, the user may be able to determine that the user needs to contact the administrator. The predetermined situation is a situation in which when an attack is made one more time, the stop process is performed but the administrator will be absent for a long time period.

The processing unit 120 may perform a process of causing the display unit 130 to display not only the attack detected indicator 400 but also a call administrator indicator 430 and a time indicator 432 and a process of causing the display unit 130 to display another indicator relating to a function of the electronic device 100. The call administrator indicator 430 and the time indicator 432 are the same as or similar to the call administrator indicator 330 and the time indicator 332 illustrated in FIG. 3, respectively. The size of the attack detected indicator 400 displayed may be smaller than the size of the use stopped indicator 300 displayed. In this case, it is possible to prevent a reduction in the convenience of the electronic device 100.

After that, when the N-th attack is detected by the detection process, the processing unit 120 performs the reactivation process as described above. Then, the electronic device 100 is reactivated by the reactivation process, the stop process is started, and the use stopped indicator 300 illustrated in FIG. 3 is displayed by the display unit 130.

After that, similarly to FIG. 2, when the administrator recognizes that the stop process has been performed, the administrator takes a measure to protect the electronic device 100 from an attacker when necessary. After that, when the administrator selects the authentication information entry prompting indicator 310 and enters the authentication information using one or more of the foregoing methods, the processing unit 120 performs the process of canceling the stop process.

As described above, when an attack is detected by the detection process a number N (N is an integer of 2 or more) of times, the processing unit 120 performs the reactivation process and the stop process and causes the display unit 130 to display the authentication information entry prompting indicator 310. When the authentication information is entered, the processing unit 120 cancels the stop process. Since the stop process is started and canceled after an attack is received a predetermined number of times or more, it is possible to protect the electronic device 100 from the attacker while maintaining balance with the convenience, and thus it is possible to appropriately handle an attack made against the electronic device 100.

Figure 7:
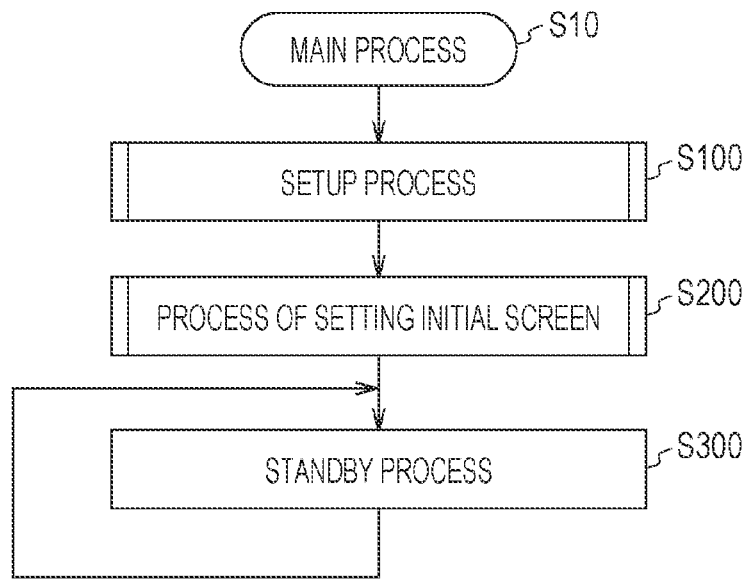
FIG. 7 is a flowchart illustrating an example of a main process.

Next, flowcharts of an example of a process to be performed by the electronic device 100 according to the embodiment are described in detail. The process to be performed by the electronic device 100 according to the embodiment includes the main process (step S10) illustrated in FIG. 7 and the timer interruption process (step S20) illustrated in FIG. 8. In the main process (step S10), after a setup process (step S100) and a process (step S200) of setting an initial screen are performed, a standby process (step S300) is repeatedly performed. The setup process (step S100) is described later in detail with reference to FIG. 9, and the process (step S200) of setting the initial screen is described later in detail with reference to FIG. 10. The standby process (step S300) is to determine whether a predetermined time period elapses. In the standby process (step S300), a process of transitioning to a power saving mode when the predetermined time period elapses is performed, and a process of transitioning from the power saving mode to a normal mode when predetermined input and output occur is performed. The normal mode is a mode in which the activation of the electronic device 100 is maintained with consumption power equal to or higher than that when the activation of the electronic device 100 is ended. The power saving mode is a mode in which the activation of the electronic device 100 is maintained with consumption power equal to or lower than that when the activation of the electronic device 100 is ended.

Figure 8:
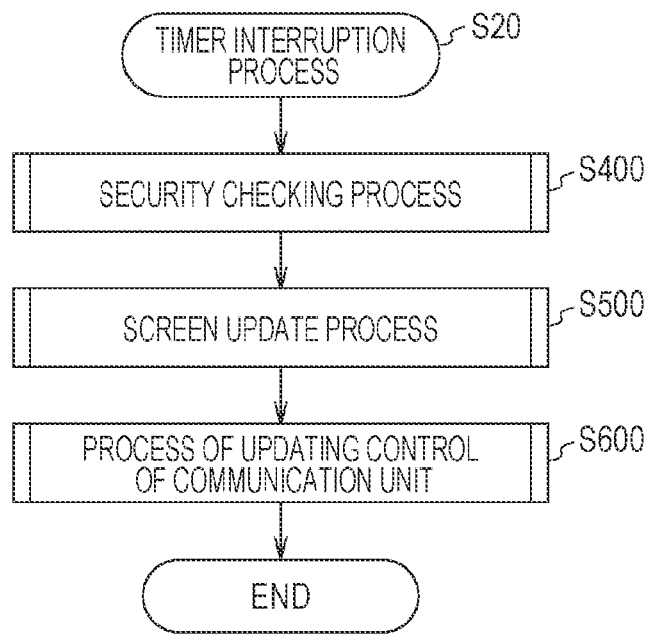
FIG. 8 is a flowchart illustrating an example of a timer interruption process.

The electronic device 100 according to the embodiment performs the timer interruption process (step S20) illustrated in FIG. 8 at predetermined time intervals of, for example, 1 second. However, the predetermined time intervals may not be 1 second. The predetermined time intervals can be set by the manufacturer of the electronic device 100, the administrator of the electronic device 100, or the like in consideration of predetermined balance. The predetermined balance is, for example, balance in which as the predetermined time intervals are shorter, the detection timing of the detection process described later is earlier and a process load and consumption power of the processing unit 120 are larger.

In the timer interruption process (step S20), a security checking process (step S400), a screen update process (step S500), and a process (step S600) of updating the control of the communication unit are performed at the foregoing predetermined time intervals. The security checking process (step S400) is described later in detail with reference to FIGS. 11 and 12. The screen update process (step S500) is described later in detail with reference to FIGS. 13, 14, and 15. The process (step S600) of updating the control of the communication unit is described later in detail with reference to FIG. 16.

The flowcharts of the electronic device 100 that enable the method according to the embodiment are not limited to the flowcharts illustrated in FIGS. 7 to 16 and can be variously modified. For example, the method according to the embodiment may be enabled by a flowchart in which the security checking process (step S400), the screen update process (step S500), and the process (step S600) of updating the control of the communication unit are included in the main process (step S10).

Figure 9:
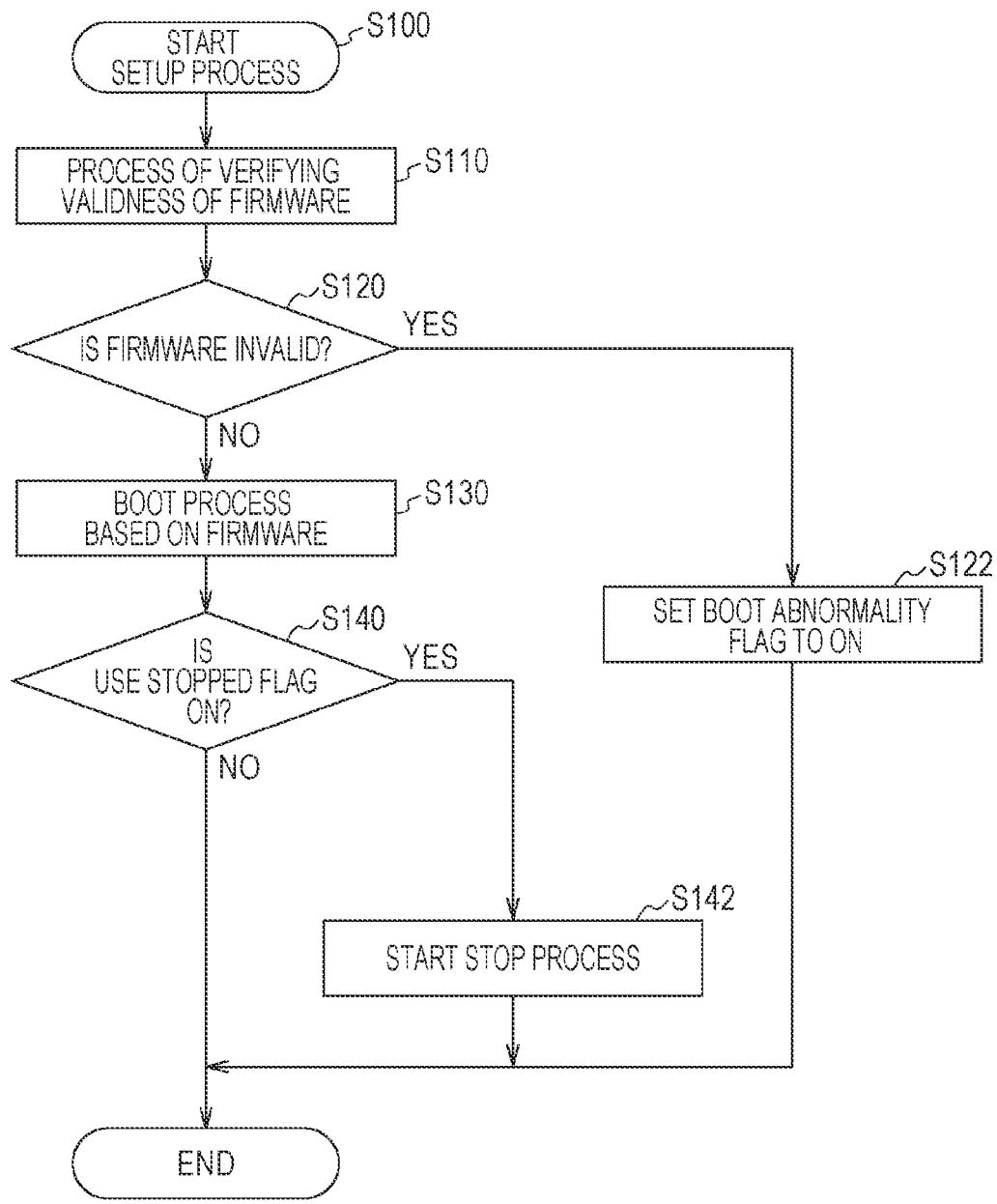
FIG. 9 is a flowchart illustrating an example of a setup process.

An example of the setup process (step S100) is described using the flowchart of FIG. 9. When the electronic device 100 is turned on, the processing unit 120 performs a process (step S110) of verifying validness of the firmware. Specifically, the processing unit 120 performs the process of verifying whether the firmware stored in the ROM 142 is a program originally installed in the electronic device 100. When the firmware is invalid (YES in step S120), the processing unit 120 performs a process (step S122) of setting a boot abnormality flag to ON and ends the setup process. When the firmware is valid (NO in step S120), the processing unit 120 performs a boot process (step S130) based on the firmware. In other words, the processing unit

120 performs a process of activating the electronic device 100 based on a boot program included in the valid firmware. This activation may be referred to as secure boot.

After the electronic device 100 is activated by the boot process (step S130) based on the firmware, when the processing unit 120 determines that a use stopped flag is OFF (NO in step S140), the processing unit 120 ends the setup process. On the other hand, when the processing unit 120 determines that the use stopped flag is ON (YES in step S140), the processing unit 120 performs a process (step S142) of starting the foregoing stop process. That is, when the electronic device 100 is turned off in a state in which the use stopped flag is ON, the stop process is started immediately after the activation. When the stop process is started, the use stopped indicator 300 is displayed by the display unit 130, as illustrated in FIG. 5.

Figure 10:
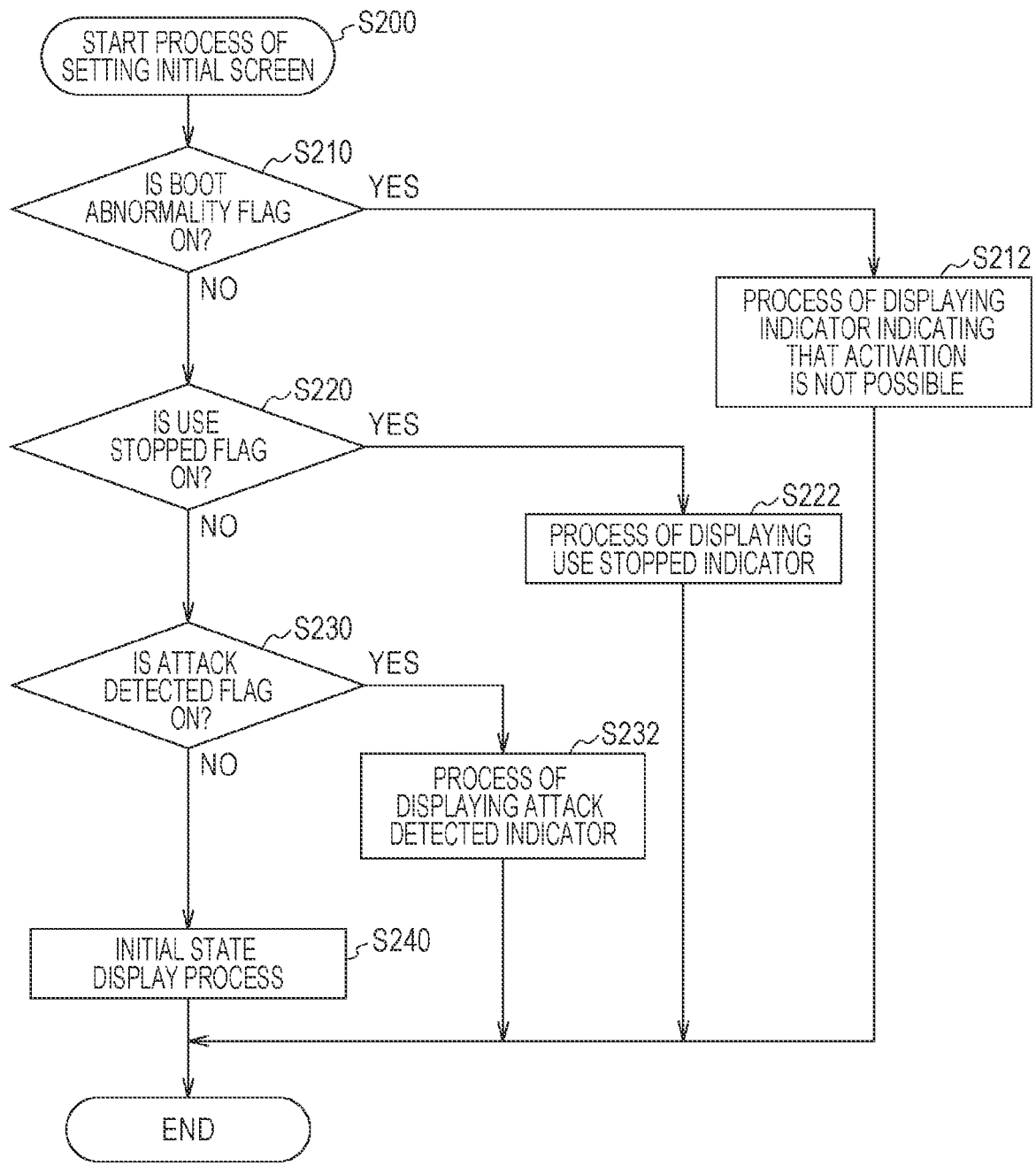
FIG. 10 is a flowchart illustrating an example of a process of setting an initial screen.

Next, an example of the process (step S200) of setting the initial screen is described using the flowchart of FIG. 10. The processing unit 120 performs a process of determining whether the boot abnormality flag is ON. When the boot abnormality flag is ON (YES in step S210), the processing unit 120 performs a process (step S212) of displaying an indicator indicating that the activation is not possible. Specifically, although not illustrated, the processing unit 120 can perform the process (step S212) by performing a process of causing the display unit 130 to display the indicator indicating that the activation of the electronic device 100 is not possible. However, the processing unit 120 may perform the process (step S212) by turning on a lamp not illustrated or causing the lamp to blink or the like. That is, as illustrated in FIG. 9, when the firmware is invalid (YES in step S120), that is, when a program not originally installed is included in the firmware stored in the ROM 142, the activation of the electronic device 100 is not possible and information indicating that the activation of the electronic device 100 is not possible is notified.

When the boot abnormality flag is OFF (NO in step S210), the processing unit 120 performs a process of determining whether the use stopped flag is ON. When the use stopped flag is ON (YES in step S220), the processing unit 120 performs a process (step S222) of displaying the use stopped indicator. Specifically, the processing unit 120 performs a process of causing the display unit 130 to display the use stopped indicator 300 described above with reference to FIG. 3. That is, when the electronic device 100 is turned off in a state in which the use stopped flag is ON, and the electronic device 100 is turned on again, the use stopped indicator 300 is displayed by the display unit 130 immediately after the activation of the electronic device 100.

As is apparent from the above description, when the electronic device 100 is turned off without an entry of the authentication information and is turned on again, the processing unit 120 activates the electronic device 100 while performing the stop process, and causes the display unit 130 to display the authentication information entry prompting indicator 310. Therefore, when the electronic device 100 is accidently turned off in a state in which the use stopped indicator 300 is displayed, it is possible to prevent an attack from being made against the electronic device 100 again until an appropriate measure is taken for the electronic device 100, and thus it is possible to appropriately handle an attack made against the electronic device 100.

When the use stopped flag is OFF (NO in step S220), the processing unit 120 performs a process of determining whether an attack detected flag is ON. When the attack detected flag is ON (YES in step S230), the processing unit 120 performs a process (step S232) of displaying the attack detected indicator. Specifically, when the electronic device 100 is turned off in a state in which the attack detected indicator 400 is displayed, and the electronic device 100 is turned on again, the attack detected indicator 400 is displayed by the display unit 130 immediately after the activation of the electronic device 100.

The processing unit 120 may omit step S230 and step S232. That is, when the electronic device 100 is turned off in a state in which the attack detected indicator 400 is displayed, and the electronic device 100 is turned on again, the attack detected indicator 400 may not be displayed immediately after the activation of the electronic device 100. This is due to the fact that the attack detected indicator 400 only indicates that an attack has been made and a function of the electronic device 100 is not particularly limited when the attack detected flag is ON.

When the attack detected flag is OFF (NO in step S230), the processing unit 120 performs an initial state display process (step S240). Specifically, when all of the boot abnormality flag, the use stopped flag, and the attack detected flag are OFF, the processing unit 120 performs a process of causing the display unit 130 to display a screen indicating an initial state after the activation of the electronic device 100. That is, the initial state display process (step S240) is a process of displaying the normal screen immediately after the activation.

Figure 11:
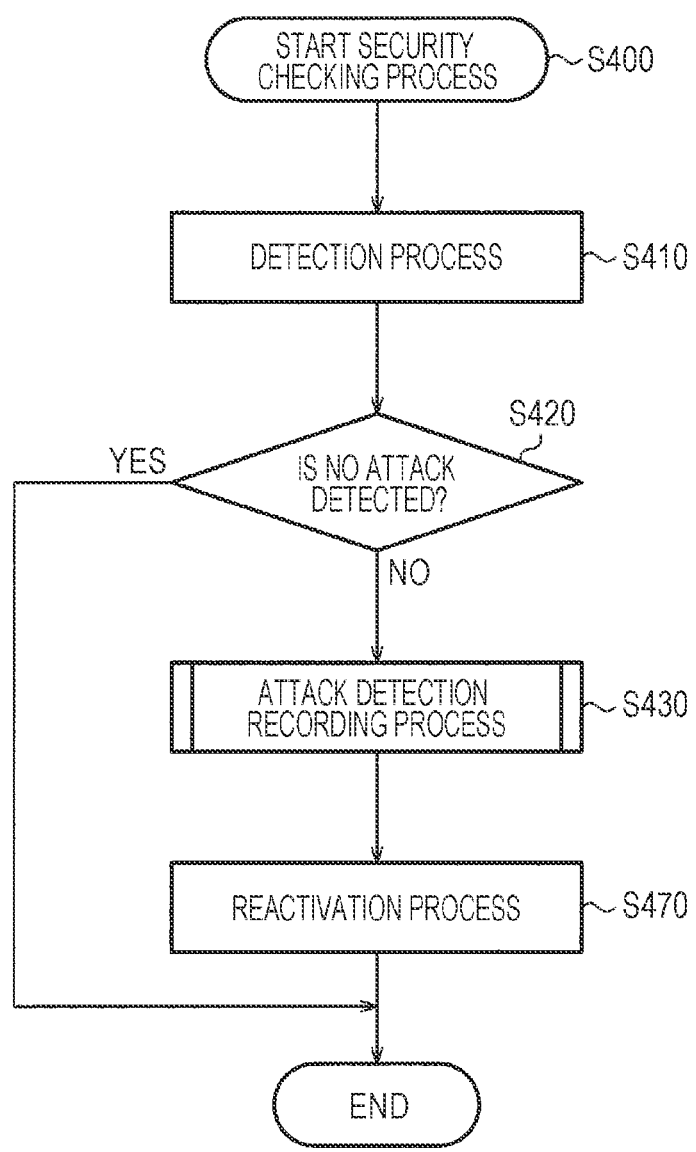
FIG. 11 is a flowchart illustrating an example of a security checking process.

Next, an example of the security checking process (step S400) is described using the flowchart of FIG. 11. First, the processing unit 120 performs the detection process (step S410) described with reference to FIGS. 2 and 5. When no attack is detected (YES in step S420), the processing unit 120 ends the security checking process. On the other hand, when an attack is detected (NO in step S420), the processing unit 120 performs an attack detection recording process (step S430) and performs a reactivation process (step S470) after the attack detection recording process (step S430). Although described later in detail with reference to FIG. 12, the attack detection recording process (step S430) is a process of recording an attack history and controlling the setting of the use stopped flag and the attack detected flag to ON and OFF based on the attack history.

As described above, when an attack is detected by the detection process, the processing unit 120 performs the attack detection recording process of recording information indicating that the attack has been made. Therefore, since it is possible to grasp a history of the attack on the electronic device 100, it is possible to appropriately handle the attack made against the electronic device 100.

Figure 12:
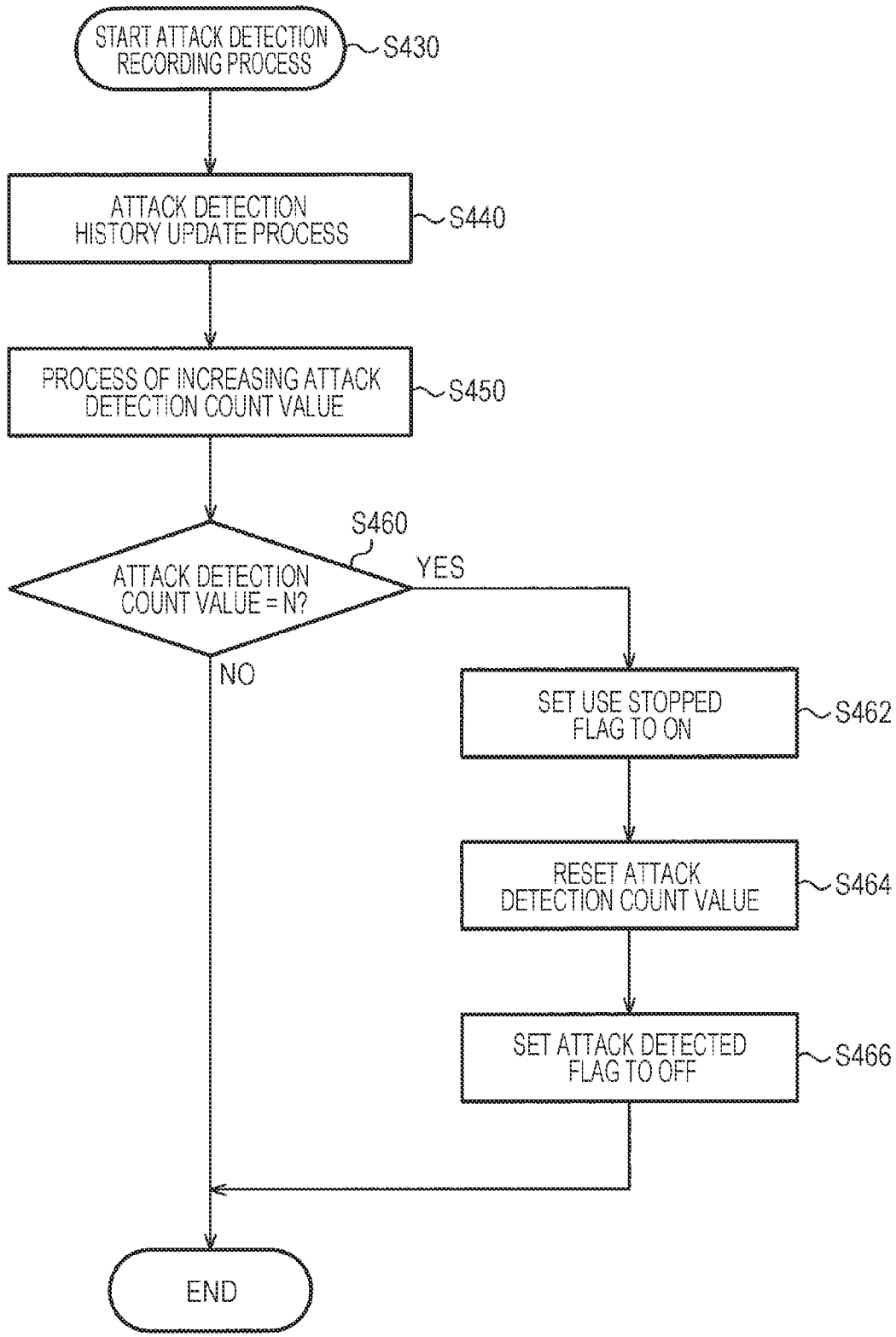
FIG. 12 is a flowchart illustrating an example of an attack detection recording process.

Next, an example of the attack detection recording process (step S430) is described using the flowchart of FIG. 12. As illustrated in FIG. 12, when an attack is detected (No in step S420), the processing unit 120 performs the attack detection recording process (step S430). In the attack detection recording process (step S430), first, the processing unit 120 performs an attack detection history update process (step S440). Specifically, the processing unit 120 performs a process of storing, to a predetermined region of the ROM 142, attack detection data on the number of times that an attack has been made or the like. The attack detection data is different from an attack detection count value described later and is not reset.

Next, the processing unit 120 performs a process (step S450) of increasing the attack detection count value. Specifically, the processing unit 120 performs a process of setting, in the ROM 142, a variable region for storing a predetermined variable and of storing, to the variable region, data indicating a counted number of times that an attack has been made. When the attack detection count value is increased from 0 to 1, the processing unit 120 sets the attack detected flag to ON.

After that, the processing unit 120 performs a process of determining whether the attack detection count value is N. When the attack detection count value is not N (NO in step S460), the processing unit 120 ends the attack detection recording process. On the other hand, when the attack detection count value is N (YES in step S460), the processing unit 120 performs a process (step S462) of setting the use stopped flag to ON, a process (step S464) of resetting the attack detection count value, and a process (step S466) of setting the attack detected flag to OFF, and ends the attack detection recording process. In this case, N is an integer of 2 or more, like N described with reference to FIG. 5. That is, when the number of times that an attack has been made reaches N, the processing unit 120 sets, to ON, the use stopped flag that causes the stop process to be performed. When a measure is taken by the administrator, the electronic device 100 returns to a state before the attack is made. Therefore, the attack detection count value is reset and the attack detected flag is set to OFF.

When the attack detection count value is not N (NO in step S460), the processing unit 120 ends the attack detection recording process. That is, when the attack detection count value is equal to or smaller than N−1 after the process (step S450) of increasing the attack detection count value is performed, the processing unit 120 performs a process of increasing, by 1, the attack detection count value indicating the number of times that an attack has been detected.

Figure 13:
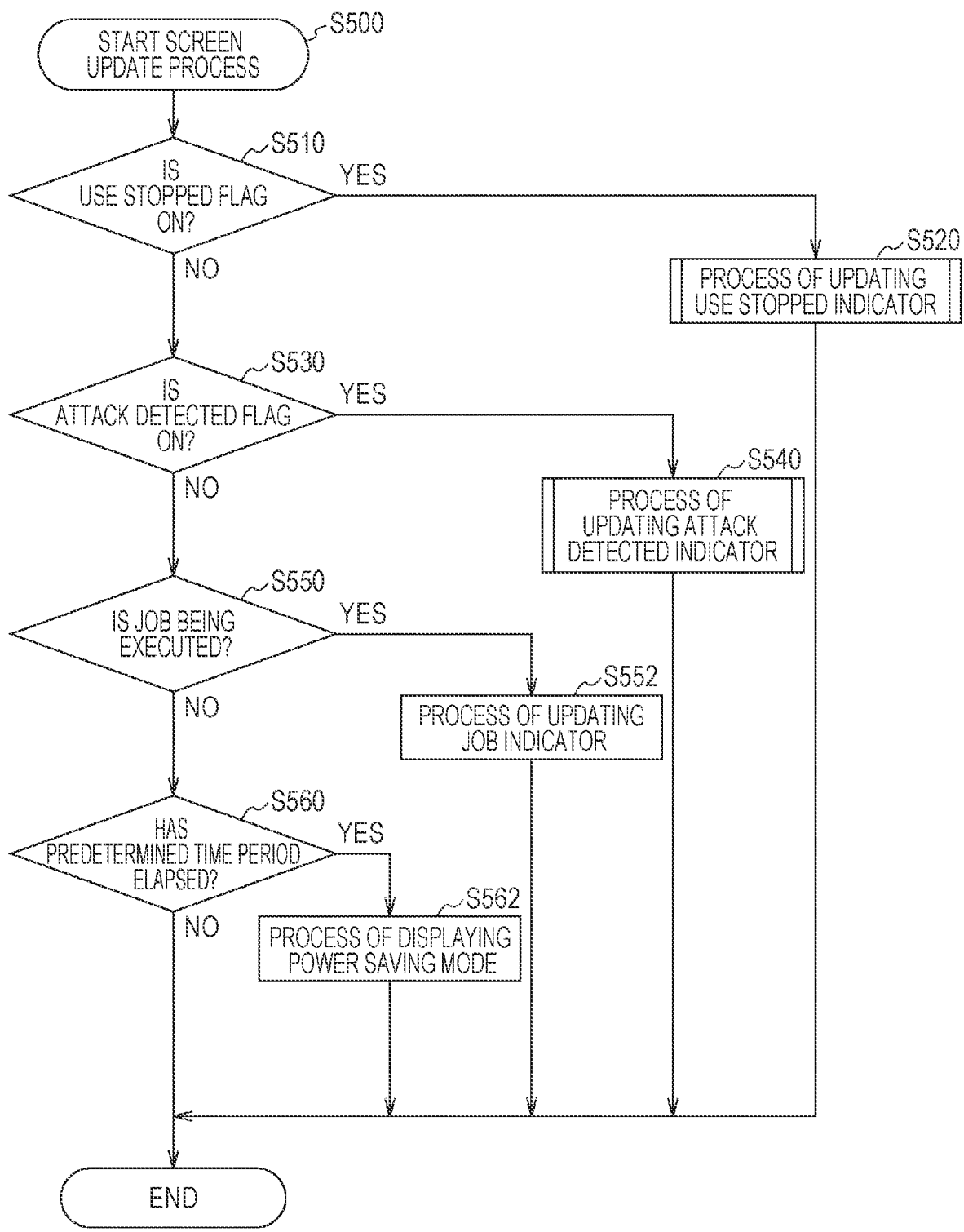
FIG. 13 is a flowchart illustrating an example of a screen update process.

Next, an example of the screen update process (step S500) is described using the flowchart of FIG. 13. While the process (step S200) of setting the initial screen as illustrated in FIG. 10 is a process relating to an indicator displayed by the display unit 130 at the time of the activation by the turning on of the electronic device 100, the screen update process (step S500) is a process relating to an update of an indicator displayed by the display unit 130 during the use of the electronic device 100.

The processing unit 120 performs a process of determining whether the use stopped flag is ON. When the use stopped flag is ON (YES in step S510), the processing unit 120 performs a process (step S520) of updating the use stopped indicator as described later with reference to FIG. 14. When the use stopped flag is OFF (NO in step S510), the processing unit 120 performs a process of determining whether the attack detected flag is ON. When the attack flag is ON (YES in step S530), the processing unit 120 performs a process (step S540) of updating the attack detected indicator. The process (step S540) is described later with reference to FIG. 15. When the attack flag is OFF (NO in step S530), the processing unit 120 performs a process of determining whether a job is being executed. When the job is being executed (YES in step S550), the processing unit 120 performs a process (step S552) of updating a job indicator. Specifically, the processing unit 120 updates the indicator indicating the degree of progress of the job or the like. When the electronic device 100 is a printer, the indicator indicating the degree of progress of the job indicates the degree of progress of a print job or the like. When the job is not being executed (NO in step S550), the processing unit 120 determines whether a predetermined time period has elapsed. When the predetermined time period has elapsed (YES in step S560), the processing unit 120 performs a process (step S562) of displaying the power saving mode and ends the screen update process. When the predetermined time period has not elapsed (NO in step S560), the processing unit 120 ends the screen update process without performing the process (step S562) of displaying the power saving mode. The predetermined time period is the same as the predetermined time period measured by the standby process (step S300) described with reference to FIG. 7. That is, after the electronic device 100 is activated and the predetermined time period elapses, the processing unit 120 performs a process of changing to an indicator corresponding to the power saving mode. The process of changing to the indicator is a process of temporarily stopping supply of power to the touch panel display constituting the display unit 130 or the like, or is a process of changing to an indicator in which luminance of the touch panel display is lower than luminance in the normal mode, or the like.

Figure 14:
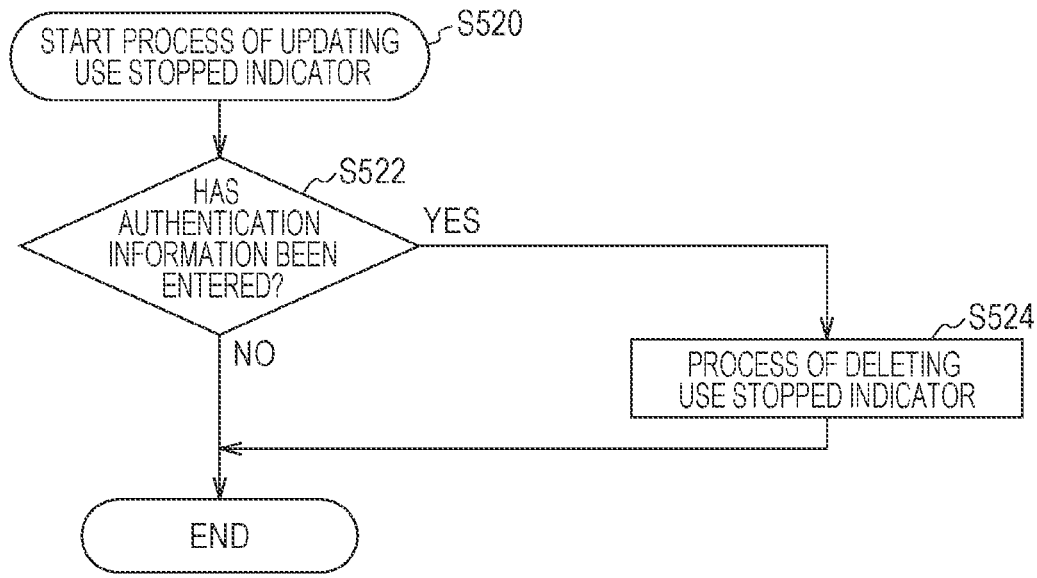
FIG. 14 is a flowchart illustrating an example of a process of updating the use stopped indicator.

Next, an example of the process (step S520) of updating the use stopped indicator is described using the flowchart of FIG. 14. The processing unit 120 performs a process of confirming whether the authentication information has been entered. When the authentication has been entered (YES in step S522), the processing unit 120 performs a process (step S524) of deleting the use stopped indicator and ends the process of updating the use stopped indicator. On the other hand, when the authentication has not been entered (NO in step S522), the processing unit 120 ends the process of updating the use stopped indicator without performing the process (step S524) of deleting the use stopped indicator. Specifically, when the authentication information is entered, the processing unit 120 sets the use stopped flag to OFF and performs the process of deleting the use stopped indicator 300.

Figure 15:
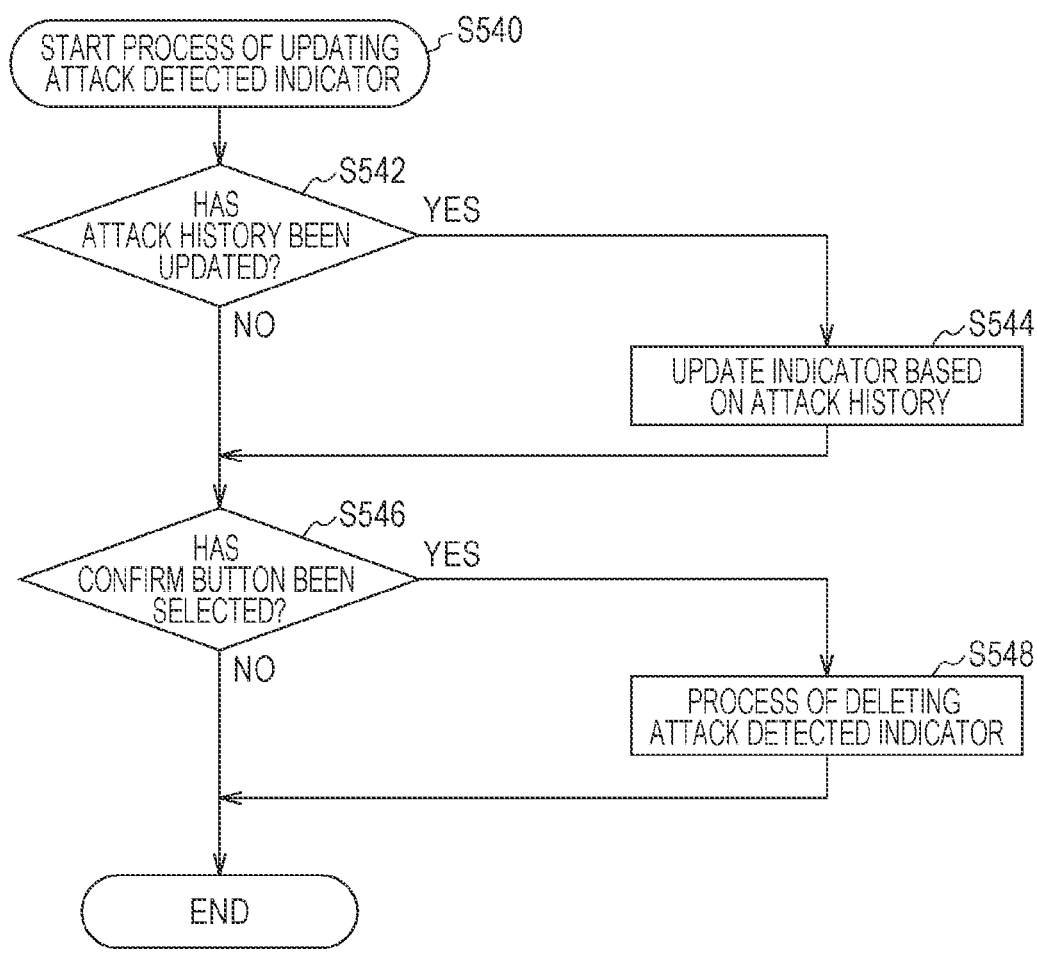
FIG. 15 is a flowchart illustrating an example of a process of updating the attack detected indicator.

Next, an example of the process (step S540) of updating the attack detected indicator is described using the flowchart of FIG. 15. The processing unit 120 performs a process of determining whether an attack history has been updated. When the attack history has been updated (YES in step S542), the processing unit 120 performs a process of updating an indicator based on the attack history (step S544). Specifically, when an attack occurs again in a state in which the attack detected indicator 400 is displayed, the processing unit 120 performs a process of updating a portion relating to the attack history of the attack history indicator 420. When the attack detected indicator 400 does not include the attack history indicator 420, the processing unit 120 may omit step S542 and step S544. Since step S542 and step S544 are performed on the assumption that an attack may occur, processes corresponding to steps S542 and S544 are not included in the process (step S400) of updating the use stopped indicator as illustrated in FIG. 14. This is due to the fact that, during the stop process, the function of the communication unit 110 is stopped and the electronic device 100 is not expected to receive an attack.

When the attack history has not been updated (NO in step S542), the processing unit 120 performs a process of determining whether the confirm button has been selected. When the confirm button has been selected (YES in step S546), the processing unit 120 performs a process (step S548) of deleting the attack detected indicator and ends the process of updating the attack detected indicator. On the other hand, when the confirm button has not been selected (NO in step S546), the processing unit 120 ends the process of updating the attack detected indicator without performing the process (step S548) of deleting the attack detected indicator. Specifically, when the user or the like selects the confirm button indicator 410 illustrated in FIG. 6, the attack detected indicator 400 is deleted from the display unit 130. The process (step S548) of deleting the attack detected indicator is a process of deleting the attack detected indicator 400 and is different from the process (step S524) of deleting the use stopped indicator as illustrated in FIG. 14 in that the attack detected flag is not set from ON to OFF.

Figure 16:
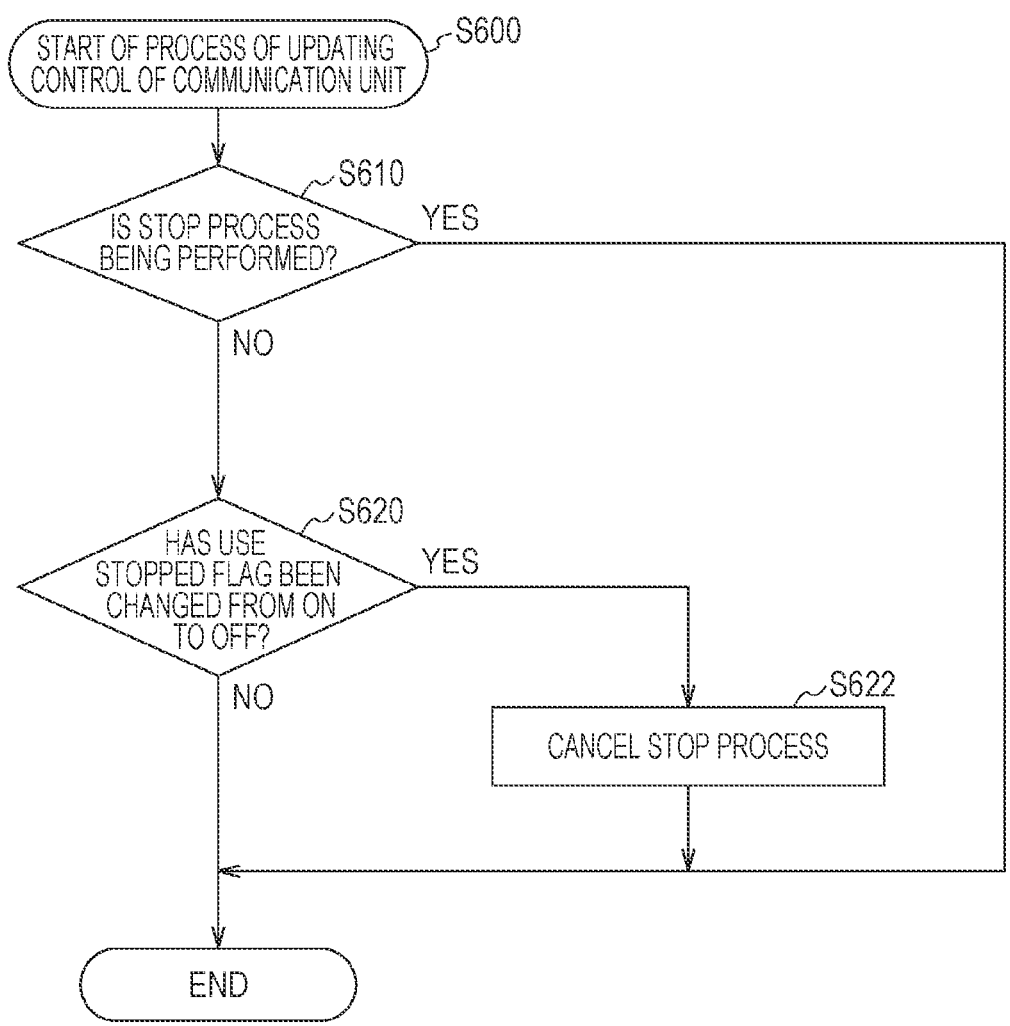
FIG. 16 is a flowchart illustrating an example of a process of updating the control of a communication unit.

Next, an example of the process (step S600) of updating the control of the communication unit is described using the flowchart of FIG. 16. The processing unit 120 performs a process of determining whether the stop process is being performed. When the stop process is not being performed (NO in step S610), the processing unit 120 performs a process of determining whether the use stopped flag has been changed from ON to OFF. When the use stopped flag has been changed from ON to OFF (YES in step S620), the processing unit 120 performs a process of canceling the stop process. The process of canceling the stop process is a process of enabling the function of the communication unit 110 to be used. On the other hand, when the stop process is being performed (YES in step S610), the processing unit 120 ends the process of updating the control of the communication unit without performing the process (step S620).

As is apparent from the above description, in the timer interruption process (S20) performed once, when the authentication information is entered (YES in step S522), the use stopped flag is set to OFF by the process (step S524) of deleting the use stopped indicator, and the communication unit 110 becomes available due to the process (step S622) of canceling the stop process.

Figure 17:
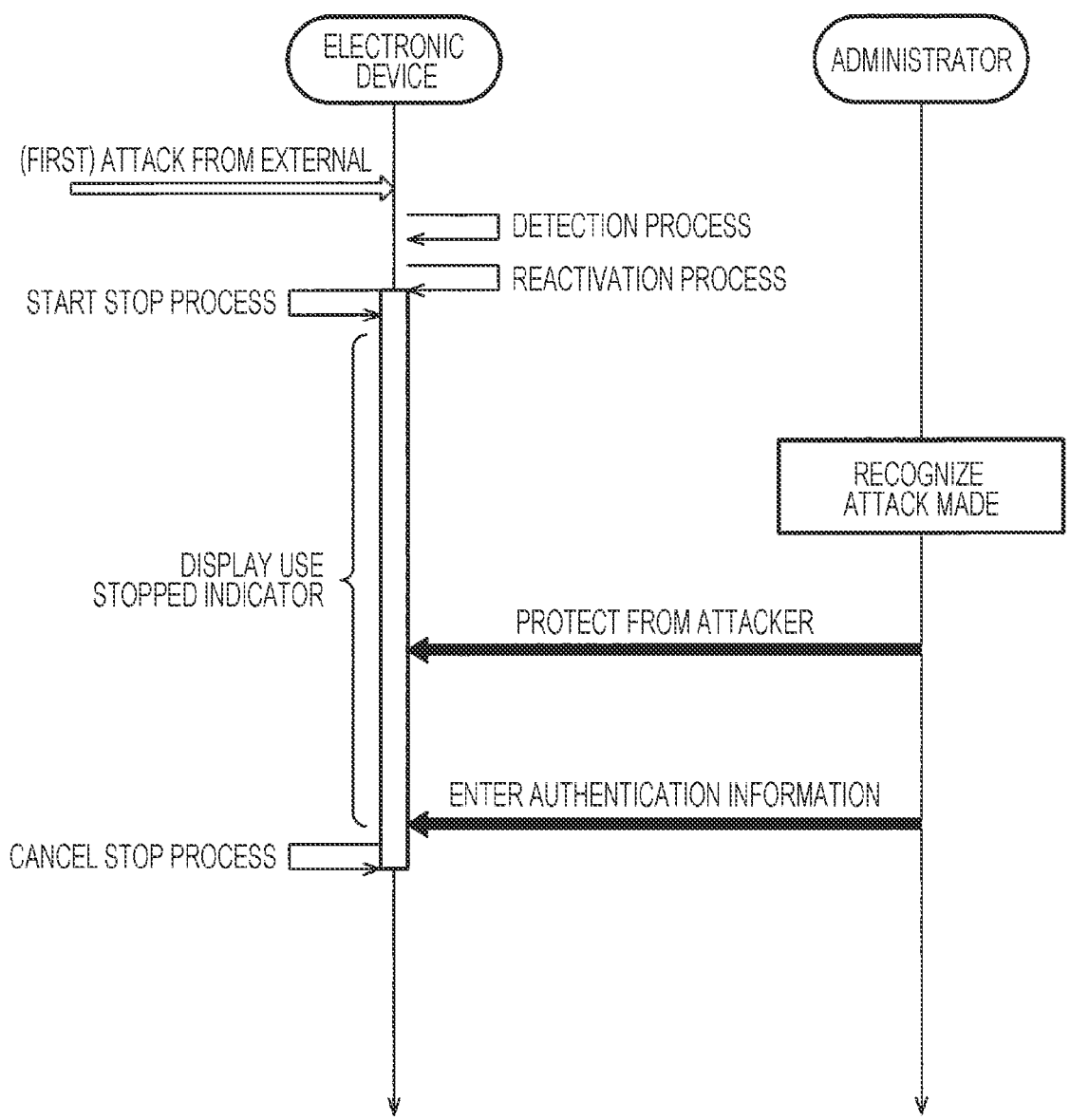
FIG. 17 is a flowchart illustrating an example of a process according to a modification of the embodiment.

In the method illustrated in FIGS. 5 to 16, the electronic device 100 can be used when at least the first attack is made. However, it is considered that, in the case where an attack that largely affects the electronic device 100 is likely to be made, the electronic device 100 is desirably immediately stopped. As a modification of the method according to the embodiment, as illustrated in FIG. 17, when the first attack is made, the stop process may be started. Specifically, when the first attack is detected by the detection process, the processing unit 120 may perform the reactivation process. After the reactivation, the processing unit 120 may start the stop process and cause the display unit 130 to display the use stopped indicator 300. After that, in the same manner as described with reference to FIG. 5, the administrator recognizes that the stop process has been performed, and takes a measure to protect the electronic device 100 from the attacker when necessary. Then, when the administrator enters the authentication information in the same manner as described above, the processing unit 120 performs the process of canceling the stop process.

As described above, when an attack is detected by the detection process, the processing unit 120 performs the reactivation process of reactivating the electronic device 100, performs the stop process, and causes the display unit 130 to display the authentication information entry prompting indicator 310. When the authentication information is entered, the processing unit 120 cancels the stop process. Therefore, it is possible to appropriately handle an attack that may largely affect the electronic device 100.

In addition, as another modification, when the N-th attack occurs in a state in which the attack detected indicator 400 is displayed due to the N-1-th attack, the processing unit 120 may start the stop process and cause the display unit 130 to display the use stopped indicator 300 without performing the reactivation process illustrated in FIG. 5. Therefore, it is possible to stop the function of the communication unit 110 on a priority basis.

As described above, the electronic device according to the embodiment that is communicatively connected to the network includes the communication unit that is communicatively connected to the network, the processing unit, and the display unit. The processing unit performs the detection process of detecting an attack made against the electronic device via the network. When the attack is detected by the detection process, the processing unit performs the stop process of stopping the function included and used in the communication unit, and causes the display unit to display the authentication information entry prompting indicator that prompts to enter the authentication information. When the authentication information is entered, the processing unit cancels the stop process.

Since the electronic device includes the communication unit, the electronic device can be communicatively connected to an external via the network. In addition, since the electronic device includes the processing unit, the processing unit can control the units of the electronic device. Furthermore, since the electronic device includes the display unit, the electronic device can cause the display unit to display the authentication information entry prompting indicator that prompts the administrator to enter the authentication information. Furthermore, since the processing unit can perform the stop process and cancel the stop process on the condition that the authentication information is entered, the electronic device can be protected from an attacker and can prevent an attack from being frequently made until the authentication information is entered, and thus it is possible to appropriately handle an attack made against the electronic device.

In addition, when the attack is detected by the detection process a number N (N is an integer of 2 or more) of times, the processing unit may perform the stop process.

In this case, it is possible to prevent a reduction in the convenience of the electronic device and appropriately handle the attack made against the electronic device.

Furthermore, when the attack is detected by the detection process a number N−1 (N is an integer of 2 or more) of times, the processing unit may perform the reactivation process of reactivating the electronic device and may not perform the stop process.

In this case, since the electronic device can be used after an effect of the attack is removed, it is possible to appropriately handle the attack made against the electronic device.

Furthermore, when the attack is detected by the detection process a number N (N is an integer of 2 or more), the processing unit may perform the reactivation process and the stop process, cause the display unit to display the authentication information entry prompting indicator, and cancel the stop process when the authentication information is entered.

In this case, since it is possible to protect the electronic device from an attacker while maintaining balance with the convenience, it is possible to appropriately handle the attack made against the electronic device.

Furthermore, when the attack is detected by the detection process, the processing unit may perform the reactivation process of reactivating the electronic device, perform the stop process, cause the display unit to display the authentication information entry prompting indicator, and cancel the stop process when the authentication information is entered.

In this case, it is possible to appropriately handle an attack that may largely affect the electronic device.

Furthermore, when the attack is detected by the detection process, the processing unit may perform the attack detection recording process of recording information indicating that the attack was made.

In this case, since it is possible to grasp a history of the attack on the electronic device, it is possible to appropriately handle the attack made against the electronic device.

Furthermore, when the electronic device is turned off without an entry of the authentication information and is turned on again, the processing unit may activate the electronic device while performing the stop process, and cause the display unit to display the authentication information entry prompting indicator.

In this case, even when the electronic device is accidently turned off, it is possible to prevent an attack from being made against the electronic device again until an appropriate measure is taken for the electronic device, and thus it is possible to appropriately handle the attack made against the electronic device.

Furthermore, when the attack is detected by the detection process, the processing unit may perform the stop process of stopping the function included and used in the communication unit and may cause the display unit to display the authentication information entry prompting indicator that prompts to enter the authentication information to be used for authentication of the administrator who manages the network connection of the electronic device.

In this case, since it is possible to reliably cancel the stop process after the administrator confirms that the stop process has been performed, it is possible to appropriately handle the attack made against the electronic device.

Furthermore, the processing unit may cancel the stop process when the authentication information is entered by using one or more of a password, an electronic card, and biometric authentication.

In this case, since the stop process can be smoothly canceled, it is possible to appropriately handle the attack made against the electronic device.

Furthermore, the processing unit may perform the detection process of detecting, as the attack, a program that intruded in the electronic device via the network and is not recognized as a program installed in the electronic device.

In this case, since it is possible to determine whether the electronic device has received the attack, it is possible to appropriately handle the attack made against the electronic device.

Furthermore, the processing unit may perform the detection process of detecting, as the attack, a program that intruded in the electronic device via the network from a terminal device connected to the network and is not recognized as a program installed in the electronic device.

In this case, since it is possible to quickly identify the cause of the attack, it is possible to appropriately handle the attack made against the electronic device.

Furthermore, the electronic device may include a printing unit that performs printing based on print data received via the communication unit.

In this case, the electronic device may be used as a printer that supports the network connection. Although printers have not been recognized as devices against which such attacks are made, it is possible to appropriately handle the attack made against the printer supporting the network connection by applying the method according to the embodiment.

The method for controlling the electronic device according to the embodiment includes communicatively connecting the electronic device to the network, performing the detection process of detecting an attack made against the electronic device via the network, performing the stop process of stopping the function used for communication and displaying the authentication information entry prompting indicator when the attack is detected by the detection process, and canceling the stop process when the authentication information is entered.

Although the embodiment is described above in detail, it will be easily understood by those skilled in the art that many modifications that do not substantially deviate from the novelty and effects of the present disclosure can be made. Therefore, the modifications are included in the scope of the present disclosure. For example, terms that have been described at least once in the specification or drawings with different terms that are broader or synonymous may be replaced with the different terms anywhere in the specification or drawings. In addition, all combinations of the embodiment and the modifications are included in the scope of the present disclosure. Furthermore, the configurations and operations of the electronic device, the method for controlling the electronic device, and the like are not limited to those described in the embodiment and can be variously modified.

What is claimed is:

1. An electronic device that is communicatively connected to a network, comprising:
   a communication semiconductor device that is communicatively connected to the network;
   a processor; and
   a display, wherein
   the processor performs a detection process of detecting an attack made against the electronic device via the network,
   when the attack is detected by the detection process, the processor performs a stop process of stopping a communication function of the communication semiconductor device so that the electronic device is disconnected from the network, and causes the display to display an authentication information entry prompting indicator that prompts to enter authentication information and a call administrator indicator notifying an administrator of the attack,
   when the authentication information is entered, the processor cancels the stop process so that the electronic device is connected to the network via the communication semiconductor device,
   when the attack is detected by the detection process a number N of times, the processor performs the stop process, N being an integer of 2 or more, and
   when the attack is detected by the detection process a number N−1 of times, the processor performs a reactivation process of reactivating the electronic device and does not perform the stop process.

2. The electronic device according to claim 1, wherein
   when the attack is detected by the detection process a number N of times, the processor performs the reactivation process and the stop process and causes the display to display the authentication information entry prompting indicator, and
   when the authentication information is entered, the processor cancels the stop process.

3. The electronic device according to claim 1, wherein
   when the attack is detected by the detection process, the processor performs a reactivation process of reactivating the electronic device, performs the stop process, and causes the display to display the authentication information entry prompting indicator, and
   when the authentication information is entered, the processor cancels the stop process.

4. The electronic device according to claim 1, wherein
   when the attack is detected by the detection process, the processor performs an attack detection recording process of recording information indicating that the attack was made.

5. The electronic device according to claim 1, wherein when the electronic device is turned off without an entry of the authentication information and is turned on again, the processor activates the electronic device while performing the stop process and causes the display to display the authentication information entry prompting indicator.

6. The electronic device according to claim 1, wherein when the attack is detected by the detection process, the processor performs the stop process and causes the display to display the authentication information entry prompting indicator that prompts to enter the authentication information to be used for authentication of an administrator who manages the network connection of the electronic device.

7. The electronic device according to claim 1, wherein when the authentication information is entered by using one or more of a password, an electronic card, and biometric authentication, the processor cancels the stop process.

8. The electronic device according to claim 1, wherein the processor performs the detection process of detecting, as the attack, a program that intruded in the electronic device via the network and is not recognized as a program installed in the electronic device.

9. The electronic device according to claim 8, wherein the processor performs the detection process of detecting, as the attack, a program that intruded in the electronic device via the network from a terminal device connected to the network and is not recognized as a program installed in the electronic device.

10. The electronic device according to claim 1, further comprising a printer that performs printing based on print data received via the communication semiconductor device.

11. A method for controlling an electronic device, comprising:
communicatively connecting the electronic device to a network;
performing a detection process of detecting an attack made against the electronic device via the network;
performing a stop process of stopping a communication function so that the electronic device is disconnected from the network and displaying an authentication information entry prompting indicator that prompts to enter authentication information, when the attack is detected by the detection process; and
canceling the stop process when the authentication information is entered so that the electronic device is connected to the network,
when the attack is detected by the detection process a number N of times, the processor performs the stop process, N being an integer of 2 or more, and
when the attack is detected by the detection process a number N−1 of times, the processor performs a reactivation process of reactivating the electronic device and does not perform the stop process.

* * * * *